US009958958B2

(12) United States Patent
Naess

(10) Patent No.: US 9,958,958 B2
(45) Date of Patent: May 1, 2018

(54) INTERACTIVE PROJECTOR AND METHOD OF CONTROLLING INTERACTIVE PROJECTOR

(71) Applicant: Seiko Epson Corporation, Tokyo (JP)

(72) Inventor: Hallvard Naess, Trondheim (NO)

(73) Assignee: Seiko Epson Corporation, Tokyo (JP)

(*) Notice: Subject to any disclaimer, the term of this patent is extended or adjusted under 35 U.S.C. 154(b) by 16 days.

(21) Appl. No.: 15/077,834

(22) Filed: Mar. 22, 2016

(65) Prior Publication Data

US 2016/0282958 A1 Sep. 29, 2016

(30) Foreign Application Priority Data

Mar. 27, 2015 (JP) ................................ 2015-065672

(51) Int. Cl.
*G06F 3/03* (2006.01)
*H04N 9/31* (2006.01)
*G06F 3/0354* (2013.01)

(52) U.S. Cl.
CPC .......... *G06F 3/0304* (2013.01); *G06F 3/0354* (2013.01); *H04N 9/31* (2013.01); *H04N 9/3194* (2013.01)

(58) Field of Classification Search
CPC ................ G06F 3/0304; G06F 3/0354; G06F 3/041–3/047; H04N 9/31; H04N 9/3194
USPC ........... 345/156, 173–178; 178/18.01–18.09, 178/18.11
See application file for complete search history.

(56) References Cited

U.S. PATENT DOCUMENTS

| 2001/0030668 | A1* | 10/2001 | Erten | G06F 3/0304 715/863 |
| 2006/0055913 | A1* | 3/2006 | Toyoda | G01J 9/00 356/121 |
| 2007/0014467 | A1* | 1/2007 | Bryll | G06K 9/4609 382/152 |
| 2011/0255761 | A1* | 10/2011 | O'Dell | G06T 7/0014 382/131 |
| 2013/0342671 | A1* | 12/2013 | Hummel | G06K 9/6202 348/77 |

(Continued)

FOREIGN PATENT DOCUMENTS

JP 2012-150636 A 8/2012

*Primary Examiner* — Stephen Sherman
(74) *Attorney, Agent, or Firm* — ALG Intellectual Property, LLC

(57) ABSTRACT

An interactive projector includes an imaging section adapted to take an image of a projected screen, a correlation value calculation section adapted to calculate a correlation value between each of template images used to detect the pointing element and a taken image taken by the imaging section and including the pointing element to generate a first correlation value for each of the template images, a correlation value map generation section adapted to generate a correlation value map representing the correlation values between the plurality of template images and the taken image based on the plurality of first correlation values generated for the respective template images, and a pointing element detection section adapted to extract a high correlation value area in the correlation value map, and calculate a centroid of the correlation values in the high correlation value area to thereby detect a tip position of the pointing element.

8 Claims, 18 Drawing Sheets

(56) References Cited

U.S. PATENT DOCUMENTS

2015/0042872 A1\* 2/2015 Suzuki .................. H04N 9/045
348/370

\* cited by examiner

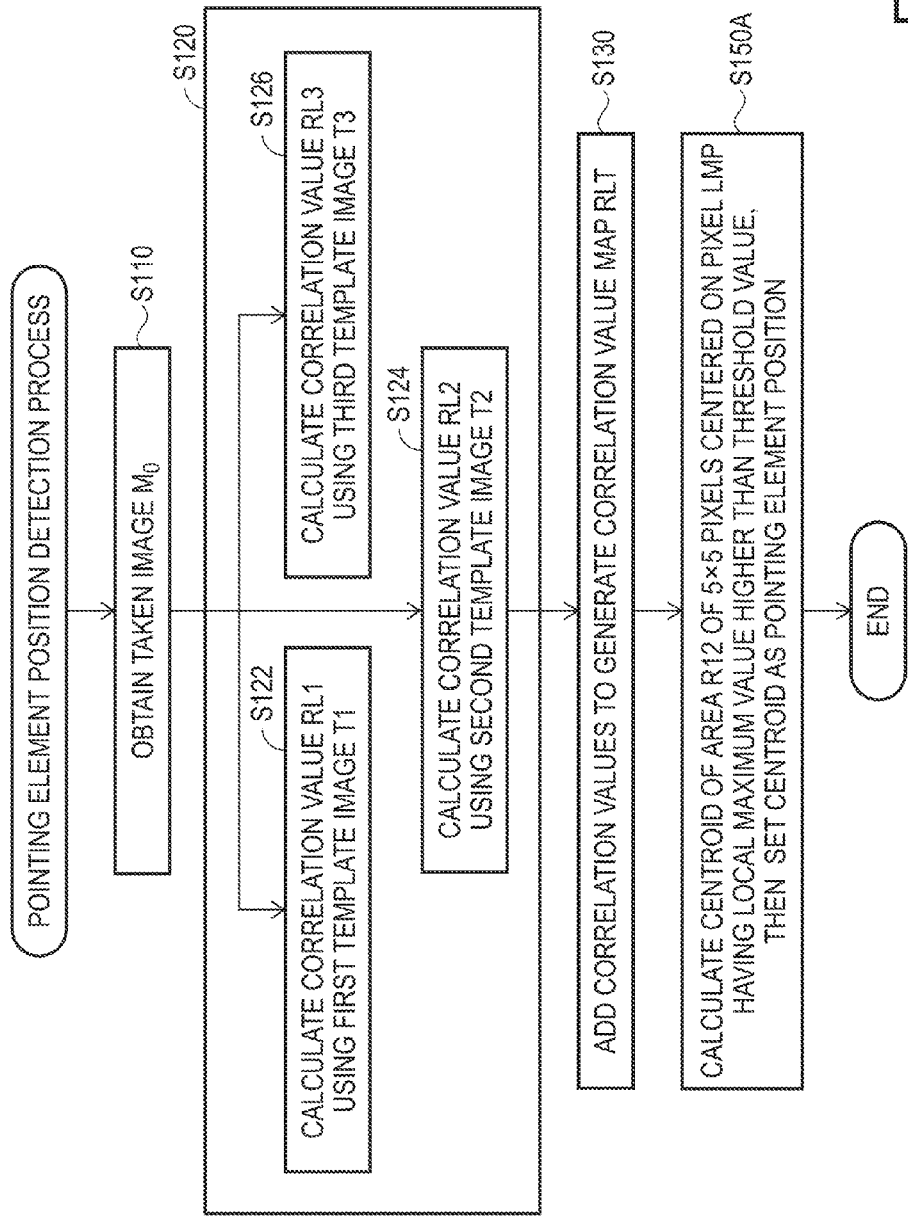

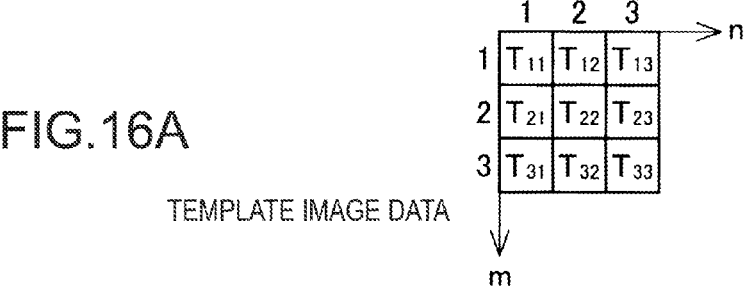
FIG.16A TEMPLATE IMAGE DATA
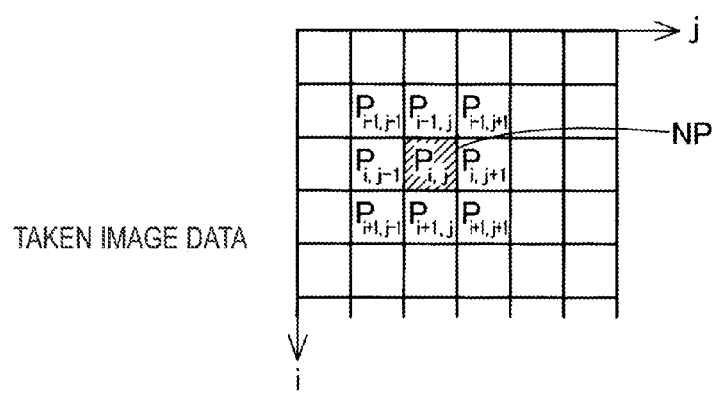
FIG.16B TAKEN IMAGE DATA
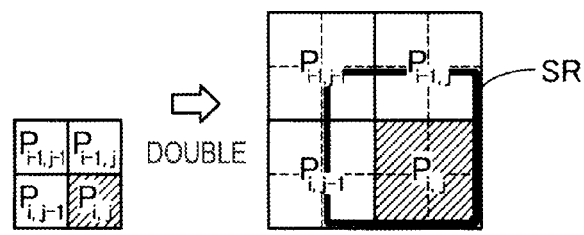
FIG.16C
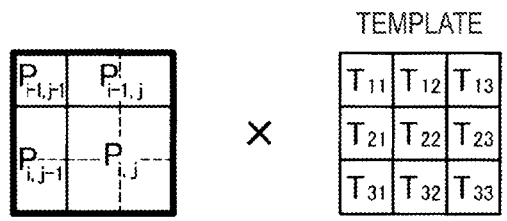
FIG.16D

TAKEN IMAGE DATA

| $P_{i-2,j-2}$ | $P_{i-2,j-1}$ | $P_{i-2,j}$ | $P_{i-2,j+1}$ | $P_{i-2,j+2}$ | $P_{i-2,j+3}$ |
|---|---|---|---|---|---|
| $P_{i-1,j-2}$ | $P_{i-1,j-1}$ | $P_{i-1,j}$ | $P_{i-1,j+1}$ | $P_{i-1,j+2}$ | $P_{i-1,j+3}$ |
| $P_{i,j-2}$ | $P_{i,j-1}$ | $P_{i,j}$ | $P_{i,j+1}$ | $P_{i,j+2}$ | $P_{i,j+3}$ |
| $P_{i+1,j-2}$ | $P_{i+1,j-1}$ | $P_{i+1,j}$ | $P_{i+1,j+1}$ | $P_{i+1,j+2}$ | $P_{i+1,j+3}$ |
| $P_{i+2,j-2}$ | $P_{i+2,j-1}$ | $P_{i+2,j}$ | $P_{i+2,j+1}$ | $P_{i+2,j+2}$ | $P_{i+2,j+3}$ |
| $P_{i+3,j-2}$ | $P_{i+3,j-1}$ | $P_{i+3,j}$ | $P_{i+3,j+1}$ | $P_{i+3,j+2}$ | $P_{i+3,j+3}$ |

×

TEMPLATE IMAGE DATA

| $T_{11}$ | $T_{12}$ | $T_{13}$ |
|---|---|---|
| $T_{21}$ | $T_{22}$ | $T_{23}$ |
| $T_{31}$ | $T_{32}$ | $T_{33}$ |

FIG.18

INTERACTIVE PROJECTOR AND METHOD OF CONTROLLING INTERACTIVE PROJECTOR

The entire disclosure of Japanese Patent Application No. 2015-065672, filed Mar. 27, 2015 is expressly incorporated by reference herein.

BACKGROUND

1. Technical Field

The present invention relates to an interactive projector and a system thereof each capable of receiving an instruction of the user to a projected screen with a pointing element.

2. Related Art

JP-A-2012-150636 (Document 1) discloses a projection display device (projector) capable of projecting a projected screen on a screen, and at the same time taking an image, which includes an object such as a finger, with a camera to detect the position of the object using the taken image. The object such as a finger is used as a pointing element for making an instruction to the projection image. In other words, when the tip of the object has contact with the screen, the projector recognizes that a predetermined instruction such as drawing is input to the projected screen, and then redraws the projected screen in accordance with the instruction. Therefore, it is possible for the user to input a variety of instructions using the projected screen as a user interface. The projector of the type capable of using the projected screen on the screen as an inputting user interface as described above is referred to as an "interactive projector." Further, the object used for making an instruction to the projected screen is referred to as a "pointing element."

In the typical interactive projector, whether or not an instruction is made using the pointing element is determined in accordance with whether or not the tip of the pointing element has contact with the screen. Therefore, it is important to detect the distance between the tip of the pointing element and the screen. In document 1, although there is described the fact that the template-matching process is performed using the object as a template to thereby detect the object, the detailed study has not been performed on the detection method of the tip position of the pointing element, and therefore, there has been demanded accurate detection of the tip position of the pointing element.

SUMMARY

An advantage of some aspects of the invention is to solve at least a part of the problems described above, and the invention can be implemented as the following forms or application examples.

(1) An aspect of the invention provides an interactive projector capable of receiving an instruction of a user to a projected screen with a pointing element. The interactive projector includes a projection section adapted to project the projected screen on a screen surface, an imaging section adapted to take an image of an area of the projected screen, a correlation value calculation section adapted to calculate a correlation value by a pixel between each of template images different from each other used to detect the pointing element and a taken image taken by the imaging section and including the pointing element using the template images to generate a first correlation value for each of the template images, a correlation value map generation section adapted to generate a correlation value map representing the correlation values between the plurality of template images and the taken image based on the plurality of first correlation values generated for the respective template images, and a pointing element detection section adapted to extract a high correlation value area having a correlation value equal to or higher than a predetermined threshold value in the correlation value map, and calculate a centroid of the correlation values in the high correlation value area with an accuracy corresponding to a value smaller than one pixel to thereby detect a tip position of the pointing element based on the centroid.

In this interactive projector, when detecting the pointing element included in the taken image using a plurality of template images, the centroid of the correlation values in the high correlation value area in the correlation value map is calculated with an accuracy corresponding to a value smaller than one pixel to detect the tip position of the pointing element based on the centroid calculated. Therefore, the detection accuracy of the position can be improved compared to the case of calculating the tip position of the pointing element by one pixel.

(2) In the interactive projector described above, the correlation value map calculation section may add the plurality of first correlation values generated for the respective template images by the pixel of the taken image to generate the correlation value map.

In this configuration, the correlation value map is generated by adding the correlation values between the template images and the taken image to each other. In the case of generating the correlation value map by adding the correlation values between the template images and the taken image to each other, the calculation becomes easier compared to the case of selecting one exhibiting a high correlation value. Therefore, the detection process of the pointing element can be expedited.

(3) In the interactive projector described above, the correlation value calculation section may further calculate the correlation value between each of the template images and the taken image using a resolution-converted image corresponding to an image obtained by converting a resolution of the taken image and the plurality of template images by the pixel of the taken image to generate a second correlation value for each of the template images, and the correlation value map generation section may generate the correlation value map based on the plurality of first correlation values and the plurality of second correlation values generated for the respective template images.

According to this configuration, in the case of calculating the correlation values using the single size template images, the pointing element different in size included in the taken image can appropriately be detected.

(4) In the interactive projector described above, the correlation value calculation section may further calculate the correlation value between each of the template images and the taken image using a resolution-converted image corresponding to an image obtained by converting a resolution of the taken image and the plurality of template images by a pixel of the resolution-converted image to generate a second correlation value for each of the template images, and the correlation value map generation section may generate the correlation value map based on the plurality of first correlation values and the plurality of second correlation values generated for the respective template images.

According to this configuration also, in the case of calculating the correlation values using the single size template images, the pointing element different in size included in the taken image can appropriately be detected.

(5) In the interactive projector described above, the correlation value map generation section may generate the correlation value map by adding the plurality of first correlation values and the plurality of second correlation values generated for the respective template images to each other by the pixel of the taken image. According to this configuration, in the case of generating the correlation value map using the plurality of template images, the calculation becomes easier compared to the case of selecting one exhibiting a high correlation value. Therefore, the detection process of the pointing element can be expedited.

(6) In the interactive projector described above, the pointing element detection section may extract an area of a plurality of pixels centered on a position where the correlation value takes a local maximum value as the high correlation value area. According to this configuration, the high correlation value area can easily be detected.

The invention can be implemented as a variety of configurations such as a system provided with a pointing element, a screen, and an interactive projector, a control method or a control device of the interactive projector, a computer program for implementing the method or the functions of the device, or a non-transitory storage medium having the computer program recorded thereon.

BRIEF DESCRIPTION OF THE DRAWINGS

The invention will be described with reference to the accompanying drawings, wherein like numbers reference like elements.

FIG. 13 is a flowchart of a pointing element position detection process according to a second embodiment of the invention.

FIGS. 16A through 16D are explanatory diagrams of a calculation method of the correlation value according to the third embodiment.

FIG. 18 is an explanatory diagram of a calculation method of the correlation value according to the fourth embodiment.

DESCRIPTION OF EXEMPLARY EMBODIMENTS

A. First Embodiment

A1. General Description of System

Figure 1:
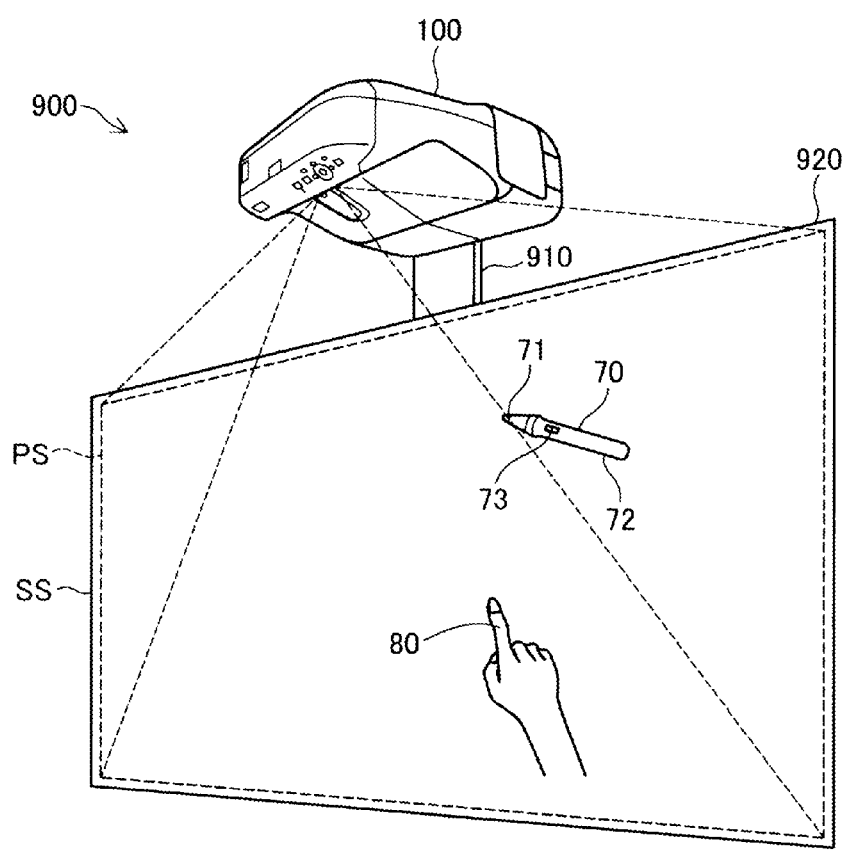
FIG. 1 is a perspective view of an interactive projection system.

FIG. 1 is a perspective view of an interactive projection system 900 according to an embodiment of the invention. The system 900 has an interactive projector 100, a screen plate 920, and a light-emitting pointing element 70. The front surface of the screen plate 920 is used as a projection screen surface SS. The projector 100 is fixed in front of and above the screen plate 920 with a support member 910. It should be noted that although the projection screen surface SS is vertically disposed in FIG. 1, it is also possible to use the system 900 with the projection screen surface SS disposed horizontally.

The projector 100 projects a projected screen PS on the projection screen surface SS. The projected screen PS normally includes an image drawn in the projector 100. In the case in which the image drawn in the projector 100 does not exist, the projector 100 irradiates the projected screen PS with light to display a white image. In the present specification, the "projection screen surface SS" (or a "screen surface SS") denotes a surface of a member on which the image is projected. Further, the "projected screen PS" denotes an area of an image projected on the projection screen surface SS by the projector 100. Normally, the projected screen PS is projected on a part of the projection screen surface SS.

The light-emitting pointing element 70 is a pen-shaped pointing element having a tip portion 71 capable of emitting light, a sleeve section 72 held by the user, and a button switch 73 provided to the sleeve section 72. The configuration and the function of the light-emitting pointing element 70 will be described later. In the system 900, one or more non-light-emitting pointing elements 80 (e.g., a non-light-emitting pen or a finger) can be used together with one or more light-emitting pointing elements 70. Hereinafter, the light-emitting pointing element 70 and the non-light-emitting pointing element 80 are also referred simply to as a pointing element 780 if not discriminated from each other.

Figure 2:
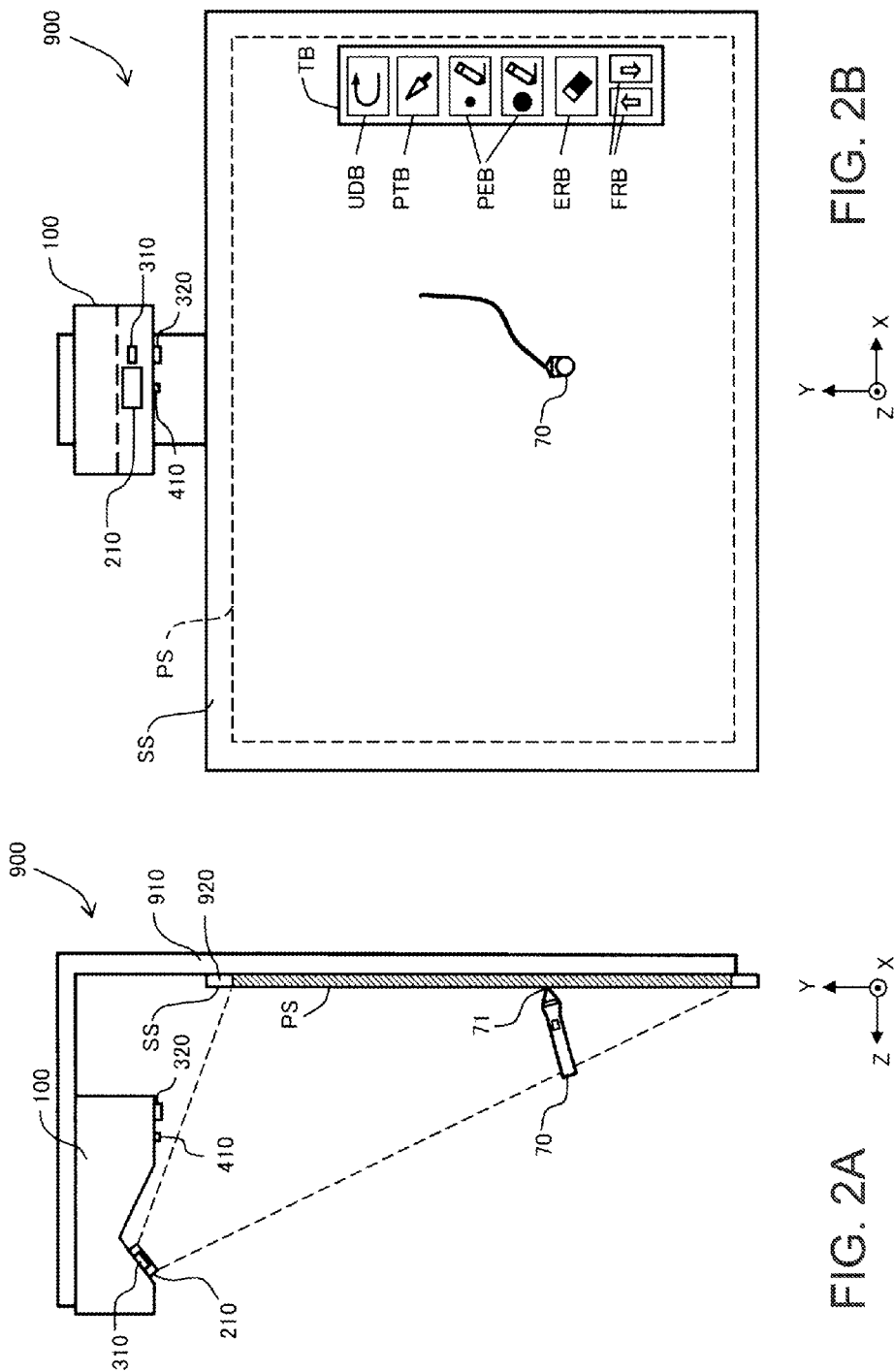
FIGS. 2A and 2B are a side view and a front view of the interactive projection system, respectively.

FIG. 2A is a side view of the interactive projection system 900, and FIG. 2B is a front view thereof. In the present specification, a direction along a horizontal direction of the screen surface SS is defined as an X direction, a direction along a vertical direction of the screen surface SS is defined as a Y direction, and a direction along a normal line of the screen surface SS is defined as a Z direction. It should be noted that the X direction is also referred to as a "horizontal direction," the Y direction is also referred to as a "vertical direction," and the Z direction is also referred to as an "anteroposterior direction" for the sake of convenience. Further, among directions along the Y direction (the vertical direction), the direction in which the projected screen PS is located viewed from the projector 100 is referred to as a "downward direction." It should be noted that in FIG. 2A, the range of the projected screen PS out of the screen plate 920 is provided with hatching for the sake of convenience of graphical description.

The projector 100 includes a projection lens 210 for projecting the projected screen PS on the screen surface SS, a first camera 310 and a second camera 320 for taking images of the area of the projected screen PS, and a detection light irradiation section 410 for illuminating the pointing element 780 with the detection light. As the detection light, near infrared light, for example, is used. The two cameras 310, 320 each have at least a first imaging function for receiving light in a wavelength region including the wavelength of the detection light to perform imaging. It is preferable for at least one of the two cameras 310, 320 to be further provided with a second imaging function for receiving light including visible light to perform imaging, and to be configured so as to be able to switch between these two imaging functions. For example, it is preferable for each of the two cameras 310, 320 to be provided with a near infrared filter switching mechanism (not shown) capable of placing a near infrared filter, which blocks visible light and transmits only the near infrared light, in front of a lens and retracting the near infrared filter from the front of the lens. The two cameras 310, 320 are the same in the horizontal position (the position in the X direction), and are arranged side by side with a predetermined distance in the anteroposterior direction (the Z direction). The two cameras 310, 320 are not limited to the present embodiment. For example, it is also possible for the two cameras 310, 320 to be the same in the anteroposterior position (the position in the Z direction), and arranged side by side with a predetermined distance in the horizontal direction (the X direction). Further, it is also possible for the two cameras 310, 320 to be different in position in all of the X, Y, and Z directions, respectively. It is preferable to dispose the two cameras so as to be different in the position in the Z direction (so as to be shifted from each other in the anteroposterior direction) since the accuracy of the Z coordinate in the calculation of the three-dimensional position using the triangulation is high.

The example shown in FIG. 2B shows the state in which the interactive projection system 900 acts in a whiteboard mode. The whiteboard mode is a mode in which the user can arbitrarily draw a picture on the projected screen PS using the light-emitting pointing element 70 or the non-light-emitting pointing element 80. The projected screen PS including a toolbox TB is projected on the screen surface SS. The toolbox TB includes a cancel button UDB for undoing the process, a pointer button PTB for selecting a mouse pointer, a pen button PEB for selecting the pen tool for drawing an image, an eraser button ERB for selecting an eraser tool for erasing the image thus drawn, and forward/backward button FRB for feeding the screen forward or backward. By touching these buttons using the pointing element, the user can perform processes corresponding to the respective buttons, or can select tools corresponding to the respective buttons. It should be noted that it is also possible to arrange that the mouse pointer is selected as a default tool immediately after starting up the system 900. In the example shown in FIG. 2B, there is described the appearance in which a line is being drawn in the projected screen PS by the user selecting the pen tool, and then moving the tip portion 71 of the light-emitting pointing element 70 within the projected screen PS in the state of having contact with the screen surface SS. The drawing of the line is performed by a projection image generation section (described later) inside the projector 100.

It should be noted that the interactive projection system 900 can act in other modes than the whiteboard mode. For example, this system 900 can also act in a PC interactive mode for displaying an image of the data, which has been transferred from a personal computer (not shown) via a communication line, on the projected screen PS. In the PC interactive mode, an image of the data of, for example, spreadsheet software is displayed, and it becomes possible to perform input, generation, correction, and so on of the data using a variety of tools and icons displayed in the image.

Figure 3:
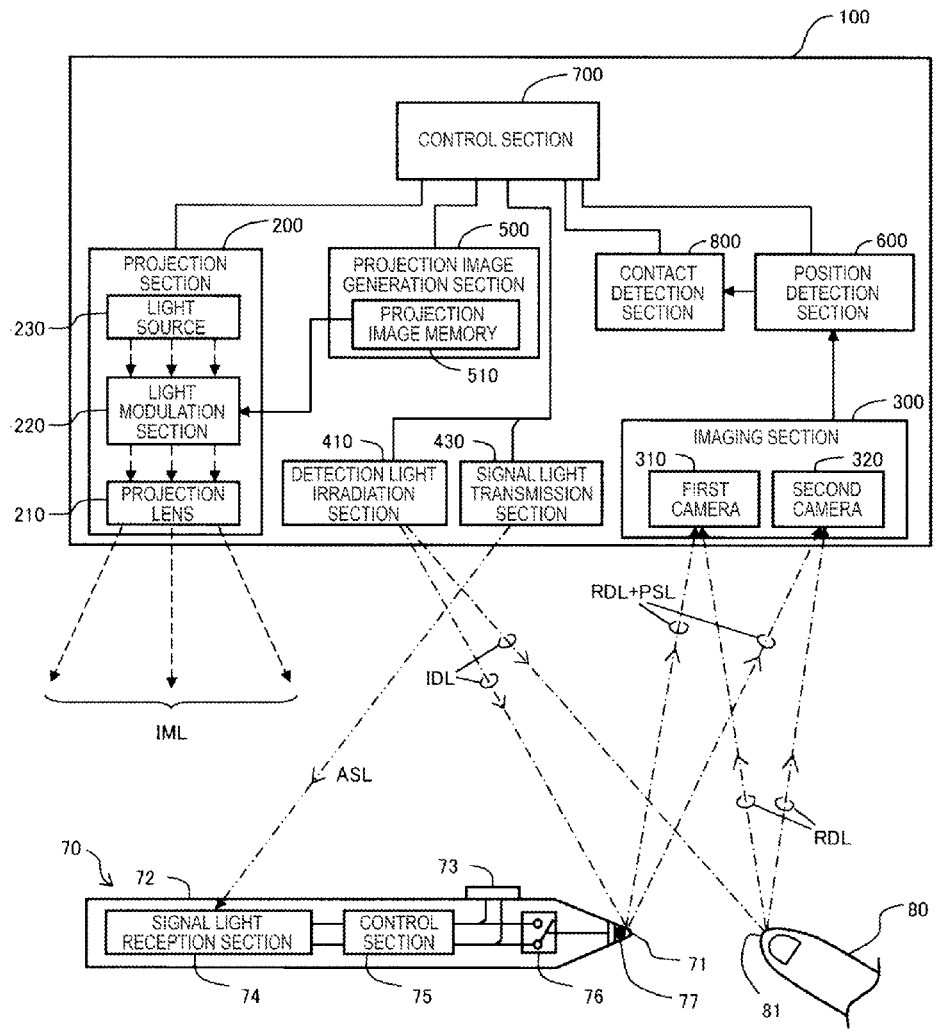
FIG. 3 is a block diagram showing an internal configuration of an interactive projector and a light-emitting pointing element.

FIG. 3 is a block diagram showing the internal configuration of the interactive projector 100 and the light-emitting pointing element 70. The projector 100 has a control section 700, a projection section 200, a projection image generation section 500, a position detection section 600, a contact detection section 800, an imaging section 300, a detection light irradiation section 410, and a signal light transmission section 430.

The control section 700 performs the control of each of the sections inside the projector 100. Further, the control section 700 determines the content of the instruction performed on the projected screen PS by the pointing element 780 based on the three-dimensional position of the pointing element 780 detected by the position detection section 600 and the contact detection of the pointing element 780 by the contact detection section 800, and at the same time commands the projection image generation section 500 to generate or change the projection image in accordance with the content of the instruction.

The projection image generation section 500 has a projection image memory 510 for storing the projection image, and has a function of generating the projection image to be projected on the screen surface SS by the projection section 200. It is preferable for the projection image generation section 500 to further be provided with a function as a keystone distortion correction section for correcting a keystone distortion of the projected screen PS (FIG. 2B).

The projection section 200 has a function of projecting the projection image, which has been generated by the projection image generation section 500, on the screen surface SS. The projection section 200 has a light modulation section 220 and a light source 230 besides the projection lens 210 explained with reference to FIGS. 2A and 2B. The light modulation section 220 modulates the light from the light source 230 in accordance with the projection image data provided from the projection image memory 510 to thereby form projection image light IML. The projection image light IML is typically color image light including the visible light of three colors of RGB, and is projected on the screen surface SS by the projection lens 210. It should be noted that as the light source 230, there can be adopted a variety of types of light source such as a light emitting diode or a laser diode, or the light source lamp such as a super-high pressure mercury lamp. Further, as the light modulation section 220, there can be adopted a transmissive or reflective liquid crystal panel, a digital mirror device, or the like, or it is possible to adopt a configuration provided with a plurality of light modulation sections 220 for respective colored light beams.

The detection light irradiation section 410 irradiates throughout the screen surface SS and the space in front of the screen surface SS with irradiating detection light IDL for detecting the tip portion of the pointing element 780. As the irradiating detection light IDL, near infrared light, for example, is used. Irradiation timing of the irradiating detection light IDL in the detection light irradiation section 410 will be described later in detail.

The signal light transmission section 430 has a function of transmitting device signal light ASL as a near infrared signal used for synchronization. When the projector 100 is started up, the signal light transmission section 430 periodically emits the device signal light ASL. A tip light emitting section 77 of the light-emitting pointing element 70 emits pointing element signal light PSL as the near infrared light having a predetermined light emission pattern (light emission sequence) in sync with the device signal light ASL. Further, when performing the position detection of the pointing element 780, the cameras 310, 320 of the imaging section 300 perform imaging at predetermined timings synchronized with the device signal light ASL.

The imaging section 300 has the first camera 310 and the second camera 320 explained with reference to FIGS. 2A and 2B. As described above, the two cameras 310, 320 each have the function of receiving light in a wavelength region including the wavelength of the detection light to thereby perform imaging. In the example shown in FIG. 3, there is described the appearance in which the irradiating detection light IDL emitted by the detection light irradiation section 410 is reflected by the pointing element 780, and then the reflected detection light RDL is received by the two cameras 310, 320 to be imaged. The two cameras 310, 320 further receive the pointing element signal light PSL, which is the near infrared light emitted from the tip light emitting section 77 of the light-emitting pointing element 70, to thereby perform imaging. Imaging by the two cameras 310, 320 is performed in both of a first period in which the irradiating detection light IDL is emitted from the detection light irradiation section 410, and a second period in which the irradiating detection light IDL is not emitted from the detection light irradiation section 410.

It should be noted that at least one of the two cameras 310, 320 is preferably provided with a function of performing imaging using the light including the visible light in addition to a function of performing imaging using the light including the near infrared light. By adopting this configuration, it is possible to take images of the projected screen PS projected on the screen surface SS with the cameras, and then make the projection image generation section 500 perform the keystone distortion correction using the images. Since the method of the keystone distortion correction using one or more cameras is well known, the explanation thereof will be omitted here.

The position detection section 600 has a function of analyzing the images (hereinafter also referred to as "taken images") taken by the two cameras 310, 320 to calculate the three-dimensional position coordinate of the tip portion of the pointing element 780 using the triangulation. On this occasion, the position detection section 600 compares the taken image in the first period and the taken image in the second period with each other to thereby determine which one of the light-emitting pointing element 70 and the non-light-emitting pointing element 80 each of the pointing elements 780 included in the images corresponds to. The details of the position detection section 600 will be described later.

The contact detection section 800 detects the contact of the pointing element 780 with the projected screen PS (the screen surface SS) based on the analysis result (the position coordinate) of the taken images by the position detection section 600. In the interactive projector 100 according to the present embodiment, the contact detection section 800 performs the detection of the contact of the light-emitting pointing element 70 with the projected screen PS based on the light emission pattern of the pointing element signal light PSL emitted by the light-emitting pointing element 70, and performs the detection of the contact of the non-light-emitting pointing element 80 with the projected screen PS based on the three-dimensional position coordinate detected by the position detection section 600.

The light-emitting pointing element 70 is provided with a signal light reception section 74, a control section 75, a tip switch 76, and the tip light emitting section 77 besides the button switch 73. The signal light reception section 74 has a function of receiving a device signal light ASL emitted from the signal light transmission section 430 of the projector 100. The tip switch 76 is a switch to be set to an ON state when the tip portion 71 of the light-emitting pointing element 70 is pushed, and set to an OFF state when the tip portion 71 is released. The tip switch 76 is normally in the OFF state, and is set to the ON state when the tip portion 71 of the light-emitting pointing element 70 has contact with the screen surface SS due to the contact pressure thereof. When the tip switch 76 is in the OFF state, the control section 75 makes the tip light emitting section 77 emit light with a specific first light emission pattern representing that the tip switch 76 is in the OFF state to thereby emit the pointing element signal light PSL having the first light emission pattern. In contrast, when the tip switch 76 becomes in the ON state, the control section 75 makes the tip light emitting section 77 emit light with a specific second light emission pattern representing that the tip switch 76 is in the ON state to thereby emit the pointing element signal light PSL having the second light emission pattern. Since the first light emission pattern and the second light emission pattern are different from each other, it is possible for the contact detection section 800 to obtain the analysis result of the images taken by the two cameras 310, 320 from the position detection section 600 to thereby determine whether the tip switch 76 is in the ON state or in the OFF state based on the analysis result.

The button switch 73 of the light-emitting pointing element 70 has the same function as that of the tip switch 76. Therefore, the control section 75 makes the tip light emitting section 77 emit light with the second light emission pattern described above in the state in which the user holds down the button switch 73, and makes the tip light emitting section 77 emit light with the first light emission pattern described above in the state in which the button switch 73 is not held down. In other words, the control section 75 makes the tip light emitting section 77 emit light with the second light emission pattern described above in the state in which at least one of the tip switch 76 and the button switch 73 is in the ON state, and makes the tip light emitting section 77 emit light with the first light emission pattern described above in the state in which both of the tip switch 76 and the button switch 73 are in the OFF state.

It should be noted that it is also possible to arrange that a different function from that of the tip switch 76 is assigned to the button switch 73. For example, in the case in which the same function as that of a right-click button of the mouse is assigned to the button switch 73, when the user holds down the button switch 73, an instruction of the right click is transmitted to the control section 700 of the projector 100, and the process corresponding to the instruction is executed. In the case in which the different function from that of the tip switch 76 is assigned to the button switch 73 as described above, the tip light emitting section 77 emits light with four light emission patterns different from one another in accordance with the ON/OFF state of the tip switch 76 and the ON/OFF state of the button switch 73. In this case, it is possible for the light-emitting pointing element 70 to make transmission to the projector 100 while distinguishing the four combinations of the ON/OFF states of the tip switch 76 and the button switch 73 from one another.

Figure 4:
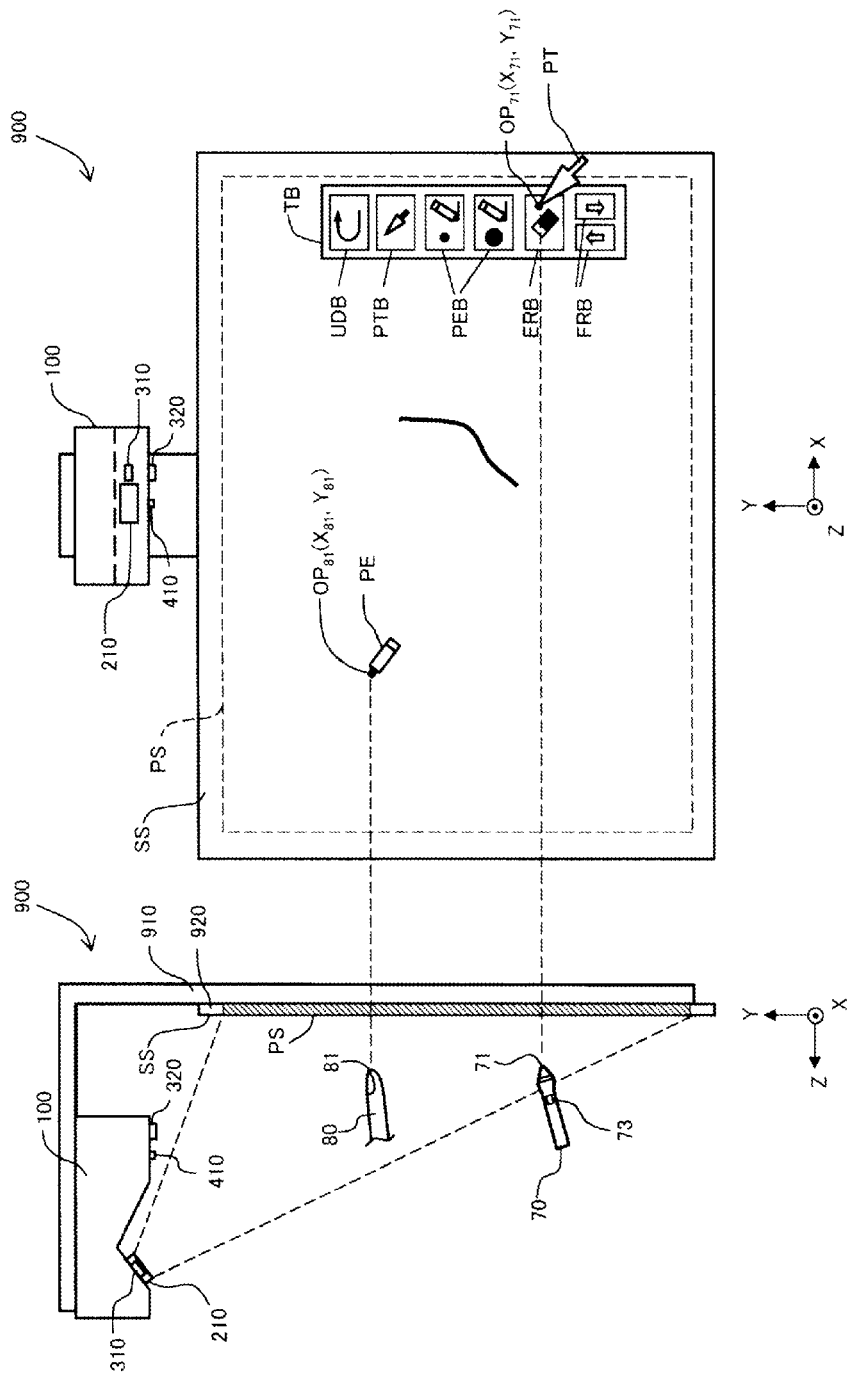
FIGS. 4A and 4B are explanatory diagrams showing an appearance of an operation using the light-emitting pointing element and a non-light-emitting pointing element.

FIGS. 4A and 4B are explanatory diagrams showing an appearance of an operation using the light-emitting pointing element 70 and the non-light-emitting pointing element 80. In this example, both of the tip portion 71 of the light-emitting pointing element 70 and the tip portion 81 of the non-light-emitting pointing element 80 are separated from the screen surface SS. The X-Y coordinate $(X_{71}, Y_{71})$ of the tip portion 71 of the light-emitting pointing element 70 is located above the eraser button ERB of the toolbox TB. Further, here, the mouse pointer PT is selected as a tool for representing the function of the tip portion 71 of the light-emitting pointing element 70, and the mouse pointer PT is drawn in the projected screen PS so that the tip $OP_{71}$ of the mouse pointer PT exists on the eraser button ERB. As described above, the three-dimensional position of the tip portion 71 of the light-emitting pointing element 70 is determined by the triangulation using the images taken by the two cameras 310, 320. Therefore, on the projected screen PS, the mouse pointer PT is drawn so that the operation point $OP_{71}$ located at the tip of the mouse pointer PT is disposed at the position of the X-Y coordinate $(X_{71}, Y_{71})$ out of the three-dimensional coordinate $(X_{71}, Y_{71}, Z_{71})$ of the tip portion 71 determined by the triangulation. In other words, the tip $OP_{71}$ of the mouse pointer PT is disposed at the X-Y coordinate $(X_{71}, Y_{71})$ out of the three-dimensional coordinate $(X_{71}, Y_{71}, Z_{71})$ of the tip portion 71 of the light-emitting pointing element 70, and the instruction of the user is performed at this position. For example, it is possible for the user to select the eraser tool by making the tip portion 71 of the light-emitting pointing element 70 have contact with the surface of the projected screen PS in this state. Further, it is also possible for the user to select the eraser tool by holding down the button switch 73 of the light-emitting pointing element 70 in this state. As described above, in the present embodiment, even in the case in which the light-emitting pointing element 70 is in the state of being separated from the screen surface SS, it is possible to provide the instruction, which corresponds to the content of the projected screen PS in the operation point $OP_{71}$ located at the X-Y coordinate $(X_{71}, Y_{71})$ of the tip portion 71, to the projector 100 by holding down the button switch 73.

In FIG. 4B, the pen tool PE is further selected as the tool representing the function of the tip portion 81 of the non-light-emitting pointing element 80, and the pen tool PE is drawn on the projected screen PS. As described above, the three-dimensional position of the tip portion 81 of the non-light-emitting pointing element 80 is also determined by the triangulation using the images taken by the two cameras 310, 320. Therefore, on the projected screen PS, the pen tool PE is drawn so that the operation point $OP_{81}$ located at the tip of the pen tool PE is disposed at the position of the X-Y coordinate $(X_{81}, Y_{81})$ out of the three-dimensional coordinate $(X_{81}, Y_{81}, Z_{81})$ of the tip portion 81 determined by the triangulation. It should be noted that when the user provides the instruction to the projector 100 using the non-light-emitting pointing element 80, the instruction (e.g., drawing and selection of the tool) is performed in the state of making the tip portion 81 of the non-light-emitting pointing element 80 have contact with the projected screen PS.

In the example shown in FIGS. 4A and 4B, even in the case in which the tip portions of the pointing elements 780 are separated from the projected screen PS, the tool (e.g., the mouse pointer PT or the pen tool PE) selected by each of the pointing elements is drawn on the projected screen PS to thereby be displayed. Therefore, there is an advantage that it is easy to understand what tools are selected by the pointing elements even in the case in which the user does not make the tip portions of the pointing elements have contact with the projected screen PS, and thus, the operation is easy. Further, since the tool is drawn so that the operation point OP of the tool is disposed at the position of the X-Y coordinate out of the three-dimensional coordinate of the tip portion of the pointing element, there is an advantage that the user can appropriately recognize the position of the tool in use.

It should be noted that the interactive projection system 900 can also be configured so that two or more light-emitting pointing elements 70 can simultaneously be used. In this case, the light emission patterns of the pointing element signal light PSL described above are preferably unique light emission patterns with which the two or more light-emitting pointing elements 70 can be identified. More specifically, in the case in which the N (N is an integer equal to or greater than 2) light-emitting pointing elements 70 can be used at the same time, the light emission patterns of the pointing element signal light PSL are preferably the patterns with which the N light-emitting pointing elements 70 can be distinguished from one another. It should be noted that in the case in which a plurality of unit light emission periods is included in a set of light emission patterns, two values, namely emission and non-emission, can be expressed in each of the unit light emission periods. Here, each of the unit light emission periods corresponds to the period for expressing 1-bit information, namely the ON/OFF state of the tip light emitting section 77 of the light-emitting pointing element 70. In the case in which the set of light emission patterns are each formed of M (M is an integer equal to or greater than 2) unit light emission periods, $2^M$ states can be distinguished by the set of light emission patterns. Therefore, it is preferable for the number M of the unit light emission periods constituting each of the set of light emission patterns to be set so as to fulfill the following formula.

$$N \times Q \leq 2^M \quad (1)$$

Here, Q denotes the number of the states distinguished by the switches 73, 76 of the light-emitting pointing element 70, and in the example of the present embodiment, Q=2 or Q=4 is set. For example, in the case of Q=4, it is preferable that M is set to an integer equal to or greater than 3 if N is 2, and M is set to an integer equal to or greater than 4 if N is 3 through 4. In this case, when the position detection section 600 (or the control section 700) identifies the N light-emitting pointing elements 70, and the states of the switches 73, 76 of each of the light-emitting pointing elements 70, the identification is performed using the M images taken in each of the cameras 310, 320 in the M unit light emission periods of the set of light emission patterns. It should be noted that the M-bit light emission patterns are patterns of setting the pointing element signal light PSL to the ON state or the OFF state in the state of keeping the irradiating detection light IDL in the OFF state, and the non-light-emitting pointing element 80 does not show up in the images taken by the cameras 310, 320. Therefore, in order to take an image to be used for detecting the position of the non-light-emitting pointing element 80, it is preferable to further add a one-bit unit light emission period with the irradiating detection light IDL set to the ON state. It should be noted that in the unit light emission period for the position detection, the pointing element signal light PSL can be either of the ON state and the OFF state. The image obtained in the unit light emission period for the position detection can be used for the position detection of the light-emitting pointing element 70.

The five specific examples of the signal light described in FIG. 3 are summed up as follows.

(1) Projection Image Light IML: the image light (visible light) projected on the screen surface SS by the projection lens 210 in order to project the projected screen PS on the screen surface SS.

(2) Irradiating Detection Light IDL: the near infrared light with which the detection light irradiation section 410 irradiates throughout the screen surface SS and the space in front of the screen surface SS for detecting the tip portions of the pointing elements 780 (the light-emitting pointing element 70 and the non-light-emitting pointing element 80).

(3) Reflected Detection Light RDL: the near infrared light reflected by the pointing elements 780 (the light-emitting pointing element 70 and the non-light-emitting pointing element 80), and then received by the two cameras 310, 320 out of the near infrared light emitted as the irradiating detection light IDL.

(4) Device Signal Light ASL: the near infrared light periodically emitted from the signal light transmission section 430 of the projector 100 in order to synchronize the projector 100 and the light-emitting pointing element 70 with each other.

(5) Pointing Element Signal Light PSL: the near infrared light emitted from the tip light emitting section 77 of the light-emitting pointing element 70 at the timing synchronized with the device signal light ASL. The light emission pattern of the pointing element signal light PSL is changed in accordance with the ON/OFF states of the switches 73, 76 of the light-emitting pointing element 70. Further, the unique light emission patterns for identifying the plurality of light-emitting pointing elements 70 are provided.

A2. Configuration and Action of Position Detection Section

Figure 5:
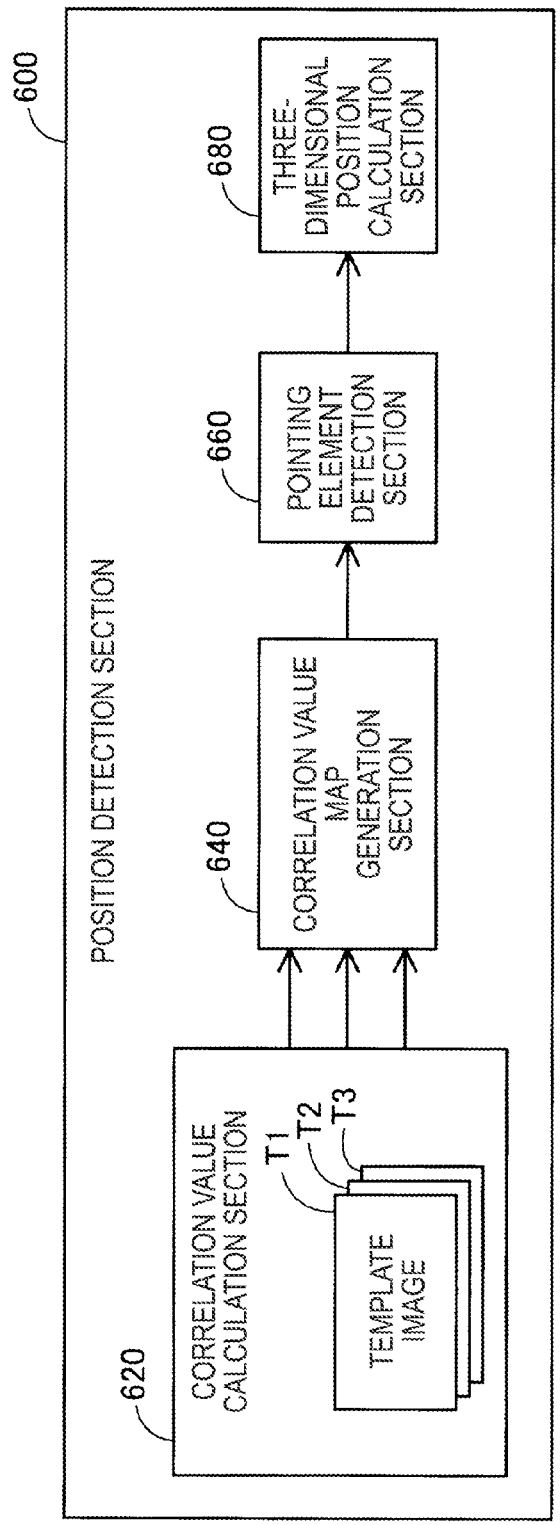
FIG. 5 is a block diagram showing a schematic configuration of a position detection section.

FIG. 5 is a block diagram showing a schematic configuration of the position detection section 600 (FIG. 3). The position detection section 600 is provided with a correlation value calculation section 620, a correlation value map generation section 640, a pointing element detection section 660, and a three-dimensional position calculation section 680. The correlation value calculation section 620 is provided with a plurality of template images (here, three template images T1 through T3). In the case in which the three template images T1 through T3 are not discriminated from each other, the template images are also referred to as template images T. The correlation value calculation section 620 calculates a correlation value between the taken image obtained by imaging the area of the projected screen PS with the imaging section 300 and each of the template images T. The correlation value calculation section 620 calculates three types of correlation values corresponding respectively to the three template images T1 through T3 with respect to each of the first taken image taken by the first camera 310 and the second taken image taken by the second camera 320. In other words, in the correlation value calculation section 620, six types of correlation values are calculated with respect to one imaging timing.

Figure 6A:
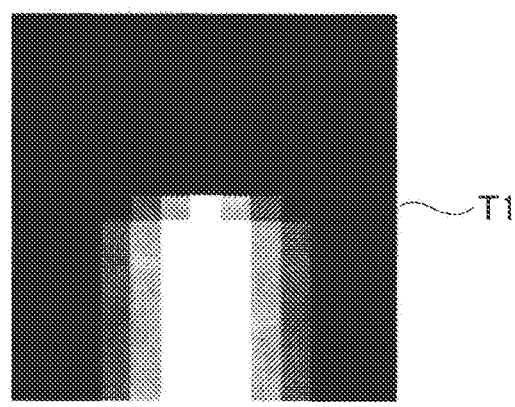
FIGS. 6A through 6C are diagrams each showing a template image.
Figure 6B:
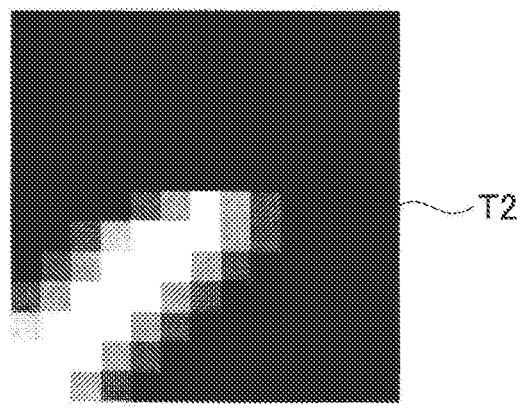
Figure 6C:
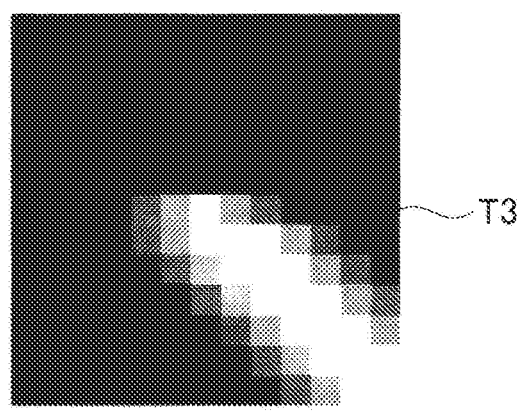

FIGS. 6A through 6C are diagrams showing the template images T1 through T3. In the present embodiment, a finger is assumed as the non-light-emitting pointing element 80. The template images T are each formed of 13×13 pixels, and are each generated so that the tip of the finger coincides with the central pixel of the template image T. Specifically, the first template image T1 (FIG. 6A) is an image of the finger with the tip pointed upward. The second template image T2 (FIG. 6B) is an image of the finger with the tip pointed obliquely upward right. The third template image T3 (FIG. 6C) is an image of the finger with the tip pointed obliquely upward left. The angle formed between the finger and the lower side in the second template image T2 and the third template image T3 is 45 degrees. It should be noted that the template images are not limited to those in the present embodiment, but a variety of types of template images can be used. For example, it is also possible to further include images of the finger with the tip pointed obliquely upward right and having the angle formed between the finger and the lower side of the template images set to 30 degrees and 60 degrees, respectively, and images of the finger with the tip pointed obliquely upward left and having the angle formed between the finger and the lower side of the template images set to 30 degrees and 60 degrees, respectively. Further, the size of the template images T can also be set arbitrarily. In the present embodiment, in order to simplify the explanation, the explanation will be presented showing an example of using the three template images T1 through T3.

The correlation value map generation section 640 (FIG. 5) generates the correlation value map by adding the correlation values calculated in the correlation value calculation section 620 for each of the taken images. Specifically, the first correlation value map with respect to the first taken image and the second correlation value map with respect to the second taken image are generated.

The pointing element detection section 660 calculates the tip position (the tow-dimensional position) of the non-light-emitting pointing element 80 (the finger) for each of the taken images with an accuracy corresponding to a value smaller than one pixel based on each of the correlation value maps. The details thereof will be described later.

The three-dimensional position calculation section 680 calculates the three-dimensional position of the tip of the non-light-emitting pointing element 80 using the triangulation based on the tip position (the two-dimensional position) of the non-light-emitting pointing element 80 calculated in the pointing element detection section 660.

In the present embodiment, the position detection of the tip portions of the light-emitting pointing element 70 and the non-light-emitting pointing element 80, and the determination of the contents instructed by the light-emitting pointing element 70 and the non-light-emitting pointing element 80 are respectively performed as follows.

The three-dimensional position of the tip portion 71 of the pointing element 780 is determined by the position detection section 600 due to the triangulation using the images taken by the two cameras 310, 320. On this occasion, whether the pointing element is the light-emitting pointing element 70 or the non-light-emitting pointing element 80 can be recognized by determining whether or not the light emission pattern of the tip light emitting section 77 appears in the images taken at a predetermined plurality of timings. In the case of the light-emitting pointing elements 70, the taken images each include the pointing element signal light PSL emitted from the tip light emitting sections 77 disposed in the respective tip portions 71 of the light-emitting pointing elements 70. Therefore, the three-dimensional position ($X_{71}$, $Y_{71}$, $Z_{71}$) of the tip portion 71 of each of the light-emitting pointing element 70 is calculated with the triangulation based on a bright point included in the taken image.

In contrast, in the case of the non-light-emitting pointing element 80, the taken images each include the reflected detection light RDL reflected by the non-light-emitting pointing element 80. The positions of the tip portion 81 of the non-light-emitting pointing element 80 in the two images respectively taken by the two cameras 310, 320 are determined using template matching. The detection of the tip position of the non-light-emitting pointing element 80 in the position detection section 600 will hereinafter be explained based on FIGS. 7 through 11, 12A, and 12B. As described above, in the position detection section 600, the tip position of the non-light-emitting pointing element 80 is detected in each of the first taken image obtained by the first camera 310 and the second taken image obtained by the second camera 320. Since the pointing element position detection process with respect to the two taken images is the same, the pointing element position detection process based on the first taken image obtained by the first camera 310 will be explained here. Hereinafter, the first taken image is simply referred to as a "taken image $M_0$."

Figure 7:
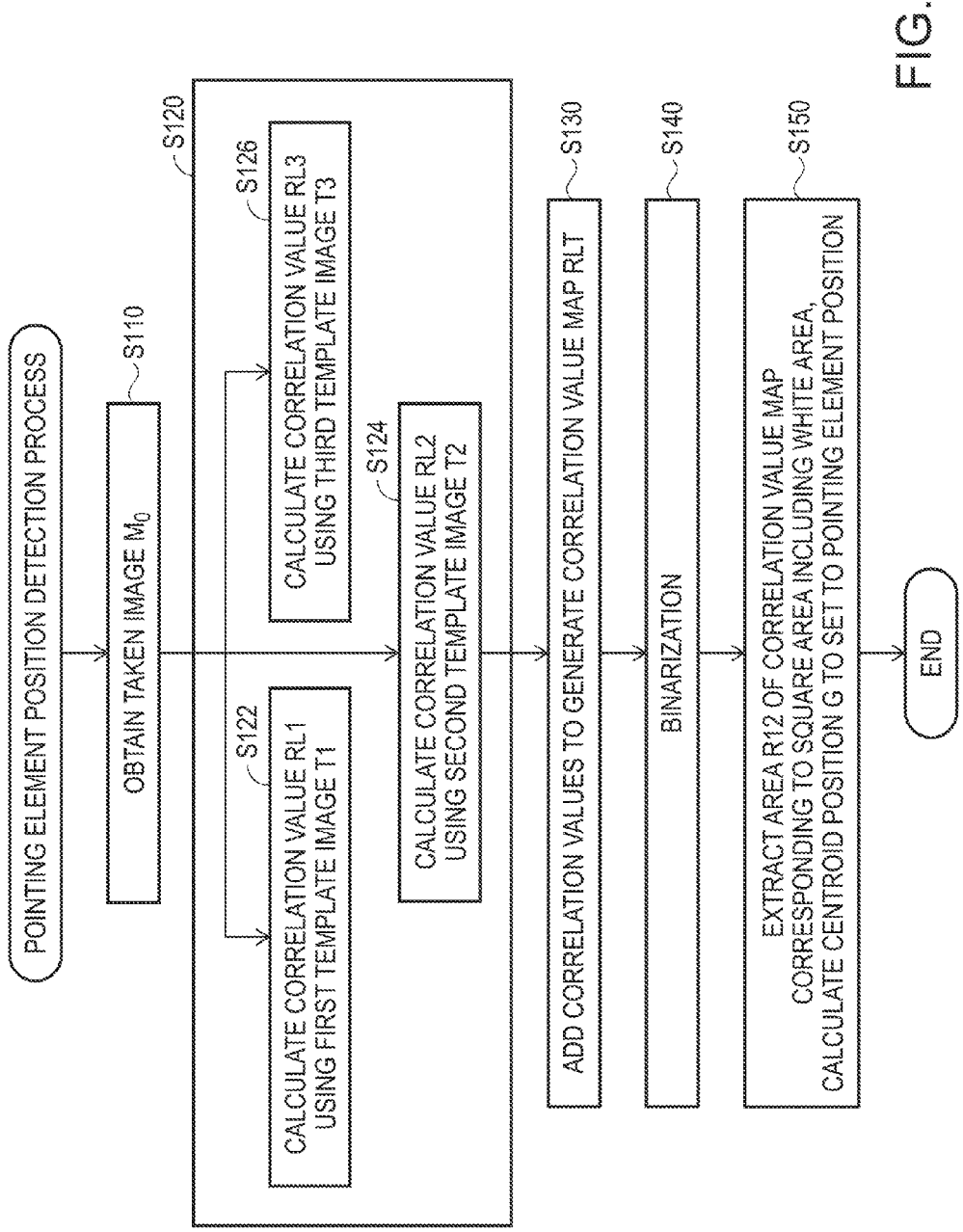
FIG. 7 is a flowchart showing the flow of a pointing element position detection process.
Figure 8:
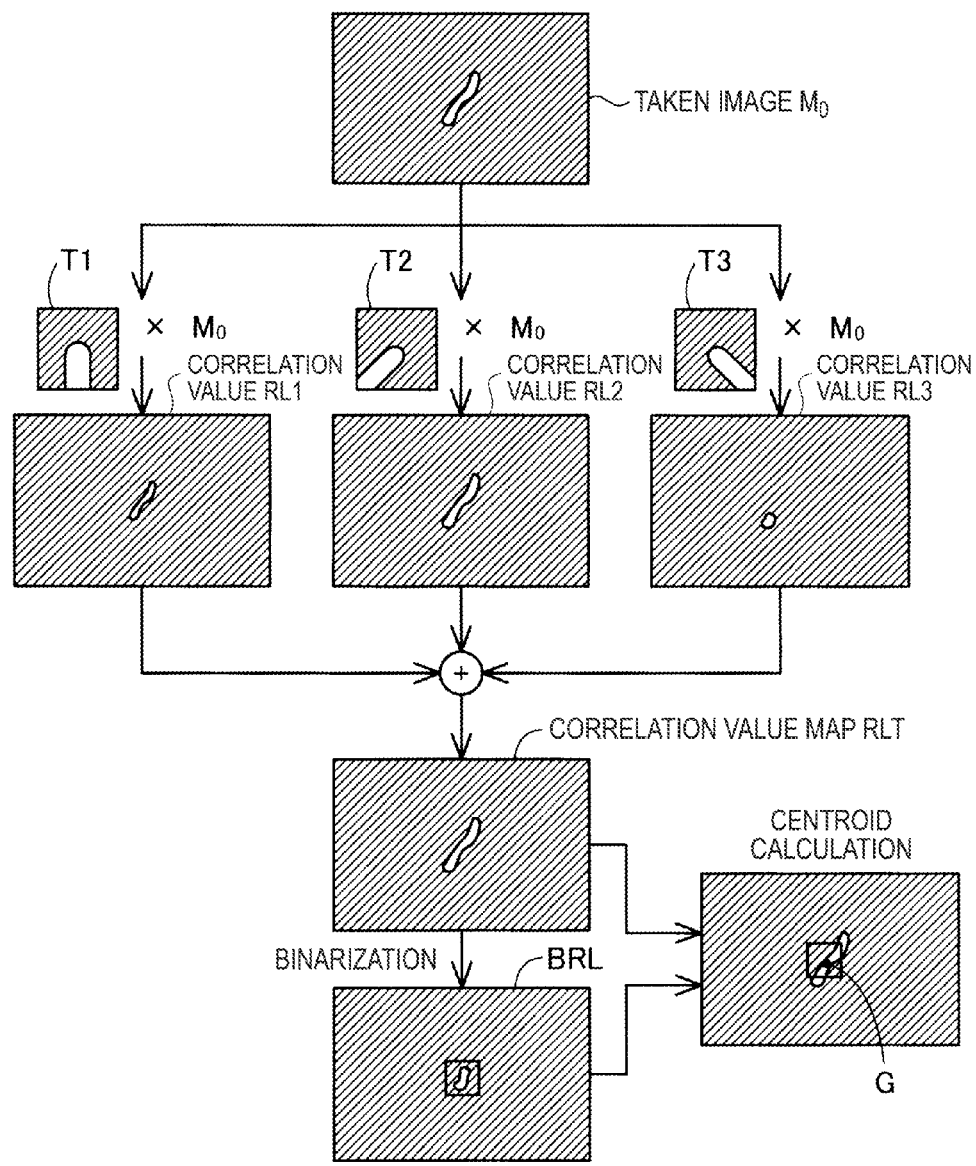
FIG. 8 is an explanatory diagram for explaining the pointing element position detection process.
Figure 9:
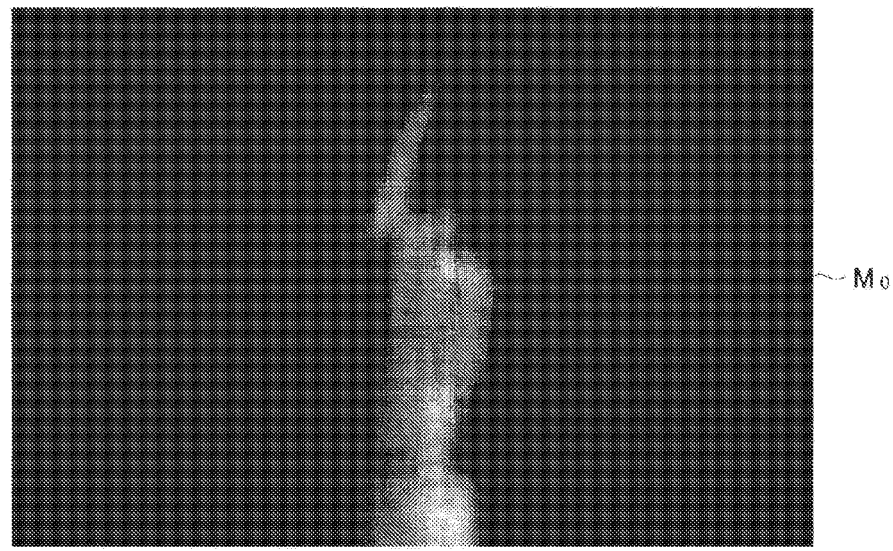
FIG. 9 is a diagram showing a part of a taken image in an enlarged manner.
Figure 10:
FIG. 10 is a diagram showing a part of a correlation value map in an enlarged manner.

FIG. 7 is a flowchart showing flow of a pointing element position detection process. FIG. 8 is an explanatory diagram for explaining the pointing element position detection process. FIG. 9 is a diagram showing a part of a taken image in an enlarged manner. FIG. 10 is a diagram showing a part of the correlation value map in an enlarged manner.

The correlation value calculation section 620 obtains (step S110 in FIG. 7) the taken image $M_0$ (FIG. 8) from the imaging section 300. FIG. 8 shows the taken image and the template image in a simplified manner. As described above, the imaging section 300 receives the reflected detection light RDL, which has been reflected by the non-light-emitting pointing element 80, to perform imaging. Therefore, in reality, the whole of the hand including the finger is included in the taken image as shown in FIG. 9. FIG. 9 shows the area including the hand out of the taken image $M_0$ in an enlarged manner. In the pointing element position detection process, the tip of the finger is detected from the hand included in the taken image $M_0$.

The correlation value calculation section 620 calculates (step S120 in FIG. 7) the correlation value between the template image T and the taken image $M_0$ pixel by pixel. In the step S120, the correlation value calculation section 620 performs the process (step S122) for calculating the correlation value RL1 between the first template image T1 and the taken image $M_0$, the process (step S124) for calculating the correlation value RL2 between the second template image T2 and the taken image $M_0$, and the process (step S126) for calculating the correlation value RL3 between the third template image T3 and the taken image $M_0$ in parallel to one another. As a result, the correlation values RL1, RL2, and RL3 different from one another by the template image can be obtained as shown in FIG. 8. In the present embodiment, the correlation values are calculated for each of the pixels of the taken image $M_0$ using convolution (a convolution operation). The calculation method of the correlation values is not limited to one in the present embodiment, but it is possible to calculate the correlation values using a well known method such as SSD (sum of squared difference; sum of squares of the differences between the pixel values) or SAD (sum of absolute difference; sum of absolute values of the differences between the pixel values). It should be noted that the more approximate the taken image and the template image are, the smaller the values calculated using SSD, SAD become, and in the case in which the taken image and the template image completely coincide with each other, the values become 0. Therefore, in order to realize the state that the more approximate the taken image and the template image are, the larger the correlation value becomes similarly to the correlation value due to the convolution, it is preferable to use a reciprocal number. The convolution can reduce the amount of calculation compared to other methods, and is therefore preferable. The correlation values RL1, RL2, RL3 in the present embodiment each correspond to a first correlation value in the appended claims.

The correlation value map generation section 640 obtains the correlation values RL1, RL2, and RL3 from the correlation value calculation section 620, then adds the correlation values RL1, RL2, and RL3 to one another for each of the pixels of the taken image $M_0$ to thereby generate (step S130 in FIG. 7) the correlation value map RLT. In such a manner as described above, there is generated the correlation value map RLT (FIG. 8) representing the correlation values between the three template images T1 through T3 and the taken image $M_0$. Although FIG. 8 shows the correlation value map in a simplified manner, in reality, such an image as shown in FIG. 10 is generated. FIG. 10 shows the area corresponding to FIG. 9 in an enlarged manner similarly to FIG. 9.

The pointing element detection section 660 binarizes the correlation value map RLT to generate (step S140 in FIG. 7) the binarized correlation value map BRL (FIG. 8).

Figure 11:
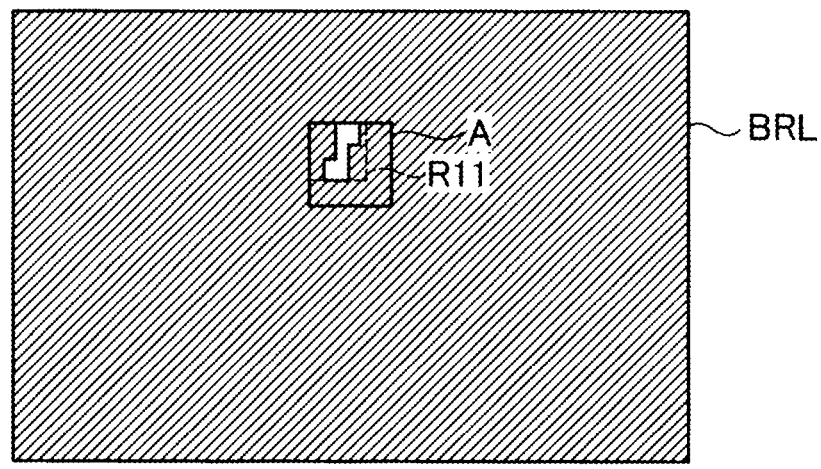
FIG. 11 is a diagram schematically showing a binarized correlation value map.
Figure 12A:
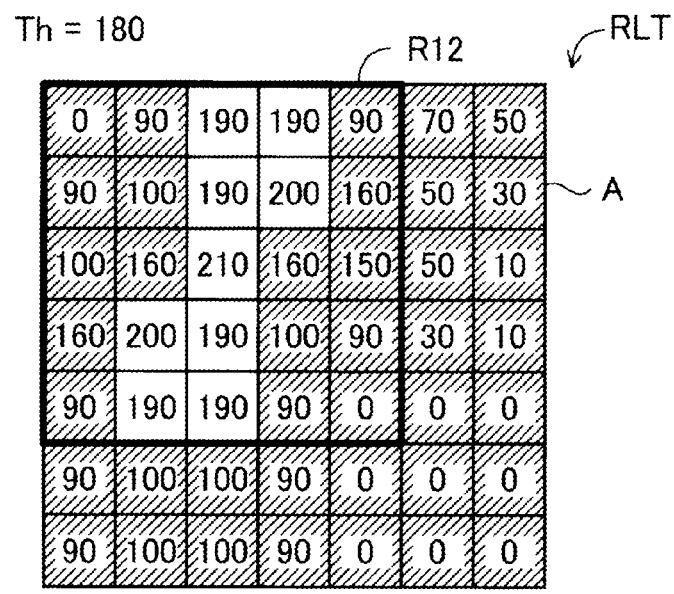
FIGS. 12A and 12B are explanatory diagrams of calculation of a centroid position in the correlation value map.
Figure 12B:
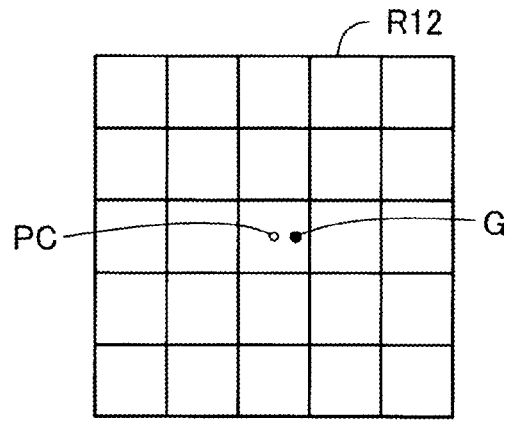

FIG. 11 is a diagram schematically showing a binarized correlation value map BRL. FIGS. 12A and 12B are explanatory diagrams for explaining calculation of a centroid position in the correlation value map. FIG. 12A shows the pixel values in a part of the correlation value map. FIG. 12A shows the area corresponding to the area A in FIG. 11 in an enlarged manner. The pixels without hatching in FIG. 12A each have the pixel value higher than a threshold value Th, and therefore turn to white (pixels having a pixel value of 1) due to the binarization, and the area with hatching turns to black (the pixels having the pixel value of 0) (FIG. 11). Although the threshold value Th=180 is set to perform the binarization in the present embodiment, the threshold value can arbitrarily be set. In the present embodiment, the threshold value is set so that the area of the consecutive white pixels falls within an area of 5×5 pixels in the binarized correlation value map BRL.

The pointing element detection section 660 determines a square area R11 (FIG. 11) of 5×5 pixels including all of the consecutive white pixels in the binarized correlation value map BRL. The pointing element detection section 660 calculates a centroid position G (FIG. 12B) of a high correlation value area R12 (FIG. 12A), which is a square area at the same position as the square area R11, with an accuracy corresponding to the value smaller than one pixel in the correlation value map RLT which has not been binarized, and then sets (step S150) the centroid position G (FIG. 12B) as the position (the pointing element position) of the tip portion 81 of the non-light-emitting pointing element 80. Here, the centroid position G ($X_G$, $Y_G$) is the position obtained taking the correlation values of the pixels in the high correlation value area R12 into consideration, and is calculated using the formulas 2a, 2b described below.

$$X_G = \Sigma \alpha i X i / \Sigma \alpha i \qquad (2a)$$

$$Y_G = \Sigma \alpha i Y i / \Sigma \alpha i \qquad (2b)$$

Here, $\alpha i$ denotes the correlation value of each of the pixels in the high correlation value area R12, Xi, Yi denotes the X coordinate and the Y coordinate of each of the pixels.

As shown in FIG. 12B, since the pixel values in the high correlation value area R12 are not symmetric about the center position PC of the high correlation value area R12, the centroid position G of the high correlation value area R12 becomes different in coordinate from the center position PC in the correlation value map RLT. In the case in which a plurality of non-light-emitting pointing elements 80 is used, a plurality of areas of consecutive white pixels is detected. For example, in the case in which two non-light-emitting pointing elements 80 are used, two areas of consecutive white pixels are detected, and two high correlation value areas R12 are extracted. By calculating the centroid of the pixels in each of the two high correlation value areas R12, the positions of the tip portions 81 of the two non-light-emitting pointing elements 80 can be detected.

Although the 5×5 pixels including the consecutive white pixels are described as an example of the high correlation value area R12, the high correlation value area R12 is not limited to this example, but is preferably an area including all of the consecutive white pixels. For example, the high correlation value area R12 can arbitrarily be set to a minimum square area including all of the consecutive white pixels. Further, the high correlation value area R12 is not limited to the square area, but can also be a minimum rectangular area including the white pixels, or an area composed of the white pixels. The size of the high correlation value area R12 can also be set so as to be associated with the threshold value. For example, in the case in which the threshold value Th is set as Th=100, the high correlation value area R12 can also be set to 7×7 pixels. The threshold value Th and the size of the high correlation value area R12 can be set in advance based on an experiment.

The three-dimensional position calculation section 680 calculates the three-dimensional position ($X_{81}$, $Y_{81}$, $Z_{81}$) of the tip portion 81 of the non-light-emitting pointing element 80 using the triangulation based on the pointing element position (X-Y coordinate) calculated from the first taken image and the second taken image by the pointing element detection section 660. It is possible for the position detection section 600 to further determine the ON/OFF states of the switches 73, 76 of the light-emitting pointing element 70.

The contact detection section 800 performs the contact detection of the non-light-emitting pointing element 80 in accordance with whether or not the difference between the Z coordinate value of the non-light-emitting pointing element 80 determined by the triangulation and the Z coordinate value of the screen surface SS is equal to or smaller than a minute allowable tolerance, namely whether or not the tip portion 81 of the non-light-emitting pointing element 80 is sufficiently close to the screen surface SS. As the allowable tolerance, it is preferable to use a small value in a range of, for example, about 2 mm through 6 mm. Further, the contact detection section 800 determines whether or not the tip portion 71 of the light-emitting pointing element 70 has contact with the screen surface SS (i.e., whether or not the tip switch 76 is in the ON state) using the light emission pattern of the tip light emitting section 77 in the images taken at the plurality of timings described above. It should be noted that the contact detection of the light-emitting pointing element 70 can also be performed based on the Z coordinate of the tip portion 71 of the light-emitting pointing element 70 similarly to the contact detection of the non-light-emitting pointing element 80.

When the detection of the three-dimensional positions, the determination of the ON/OFF state of each of the button switches 73, and the contact detection of the tip portions of the pointing elements 780 are completed, the control section 700 determines the instruction content by the pointing elements 780 (the light-emitting pointing elements 70, the non-light-emitting pointing element 80) based on the detection results of the position detection section 600 and the contact detection section 800, then makes the projection image generation section 500 generate the image corresponding to the instruction content, and then makes the projection section 200 project the image corresponding to the instruction content on the screen surface SS. For example, in the case in which the tip switch 76 or the button switch 73 becomes in the ON state in the state in which the position of the X-Y coordinate of the tip portion 71 is located on any of the buttons in the toolbox TB (FIG. 2B), the tool of that button is selected. Further, as shown in FIG. 2B as an example, if the tip switch 76 or the button switch 73 turns to the ON state in the state in which the X-Y coordinate of the tip portion 71 is located at a position outside the toolbox TB in the projected screen PS, the process (e.g., drawing) using the tool thus selected is selected. The control section 700 makes the projection image generation section 500 draw a pointer or a mark selected in advance so that the pointer or the mark is disposed at the position ($X_{71}$, $Y_{71}$) or ($X_{81}$, $Y_{81}$) in the projected screen PS using the X-Y coordinate ($X_{71}$, $Y_{71}$) of the tip portion 71 of the light-emitting pointing element 70 or the X-Y coordinate ($X_{81}$, $Y_{81}$) of the tip portion 81 of the non-light-emitting pointing element 80. Further, the control section 700 performs the process corresponding to the content instructed by the light-emitting pointing element 70 or the non-light-emitting pointing element 80, and then makes the projection image generation section 500 draw the image including the processing result.

As described above, in the present embodiment, when detecting the non-light-emitting pointing element 80 included in the taken image $M_0$ by the template matching using the plurality of template images T, the correlation values RL1, RL2, and RL3 between the respective template images and the taken image $M_0$ are added to one another for each of the pixels of the taken image $M_0$ to thereby generate the correlation value map representing the correlation between the plurality of template images T and the taken image $M_0$. In the case of performing the template matching using a plurality of template images, the calculation becomes easier compared to the case of selecting the image exhibiting a high correlation value, and therefore, speeding up of the detection processing of the non-light-emitting pointing element 80 can be achieved.

Further, in the interactive projector 100, the centroid of the correlation values in the high correlation value area R12 in the correlation value map RLT is detected as the position of the tip portion 81 of the non-light-emitting pointing element 80. In the present embodiment, since the centroid of the correlation values in the high correlation value area R12 is calculated with the accuracy corresponding to the value smaller than one pixel, the detection accuracy of the position of the tip portion 81 of the non-light-emitting pointing element 80 can be improved compared to the case of calculating the tip position of the non-light-emitting pointing element 80 by one pixel.

B. Second Embodiment

Figures 14A, 14B:
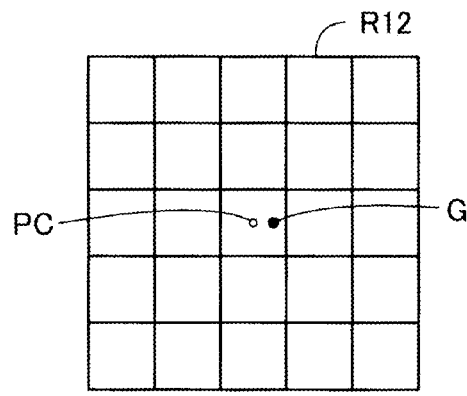
FIGS. 14A and 14B are explanatory diagrams of calculation of a centroid position in the correlation value map according to the second embodiment.

FIG. 13 is a flowchart showing flow of a pointing element position detection process according to a second embodiment. FIGS. 14A and 14B are explanatory diagrams for explaining calculation of the centroid position in the correlation value map in the second embodiment. In the second embodiment, the steps S110, S120, and S130 in the first embodiment (FIG. 7) described above are performed, and then the step S150A is performed instead of the steps S140, S150. In the step S150A, the pointing element detection section 660 selects the area of 5×5 pixels centered on a pixel LMP (indicated with hatching in FIG. 14A), which has a local maximum value higher than the threshold value Th, as the high correlation value area R12 (FIG. 14A) in the correlation value map RLT. Then, the pointing element detection section 660 calculates the centroid position G (FIG. 14B) of the correlation values of the pixels in the high correlation value area R12 with an accuracy corresponding to the value smaller than one pixel, and then sets the centroid position G as the position (the pointing element position) of the tip portion 81 of the non-light-emitting pointing element 80. In other words, in the second embodiment, the binarization of the correlation map RLT is not performed. According also to this configuration, substantially the same advantages as described above can be obtained. In the case in which the plurality of non-light-emitting pointing elements 80 is used, a plurality of local maximum values equal to or higher than the threshold value is detected. For example, in the case in which two non-light-emitting pointing elements 80 are used, two local maximum values equal to or higher than the threshold value are detected, and two high correlation value areas R12 are extracted, respectively. By calculating the centroid of the pixels in each of the two high correlation value areas R12, the positions of the tip portions 81 of the two non-light-emitting pointing elements 80 can be detected. Although the 5×5 pixels are described as an example of the high correlation value area R12, the size of the high correlation value area R12 is not limited thereto, but can arbitrarily be set.

C. Third Embodiment

Figure 15:
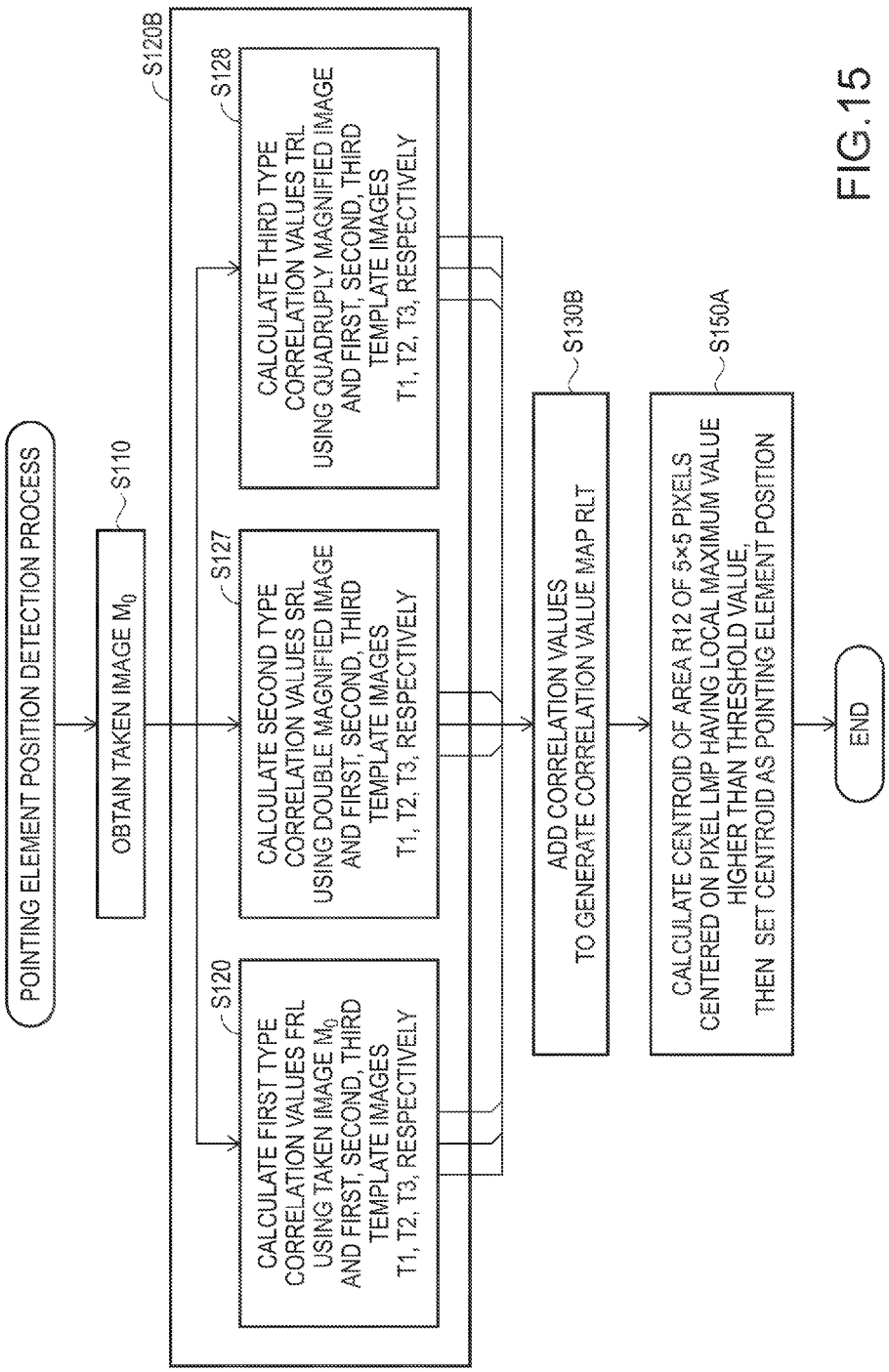
FIG. 15 is a flowchart of a pointing element position detection process according to a third embodiment of the invention.

FIG. 15 is a flowchart showing flow of a pointing element position detection process according to a third embodiment. In the third embodiment, an image increased in resolution is also used in the process (step S120B in FIG. 15) of calculating the correlation values between the template images T and the taken image $M_0$. The rest of the process is substantially the same as that of the second embodiment described above. The correlation value calculation section 620 obtains (step S110) the taken image $M_0$ from the imaging section 300, and then calculates (step S120B in FIG. 15) the correlation values between the template images T and the taken image $M_0$. In the step S120B, the correlation value calculation section 620 performs the process (step S120) of calculating a first type correlation value FRL between each of the template images T and the taken image $M_0$ using the taken image $M_0$ and the plurality of template images T1 through T3, a process (step S127) of calculating a second type correlation value SRL between each of the template images T and the taken image $M_0$ using a double magnified image with a resolution two times as high as that of the taken image $M_0$ and the plurality of template images T1 through T3, and a process (step S128) of calculating a third type correlation value TRL between each of the template images T and the taken image $M_0$ using a quadruply magnified image with a resolution four times as high as that of the taken image $M_0$ and the plurality of template images T1 through T3 in parallel to one another. The step S120 in the present embodiment is substantially the same as the step S120 in the first embodiment (FIG. 7) described above. Specifically, in the step S120, the correlation value calculation section 620 calculates three first type correlation values FRL1 through FRL3 corresponding respectively to the three template images T1 through T3. Similarly, in the step S127, the correlation value calculation section 620 calculates three second type correlation values SRL1 through SRL3 corresponding respectively to the three template images T1 through T3. Similarly, in the step S128, the correlation value calculation section 620 calculates three third type correlation values TRL1 through TRL3 corresponding respectively to the three template images T1 through T3. In other words, in the present embodiment, in the process (step S120B) of calculating the correlation values between the template images T and the taken image $M_0$, the nine correlation values (FRL1 through FRL3, SRL1 through SRL3, and TRL1 through TRL3) are calculated. The double magnified image and the quadruply magnified image in the present embodiment each correspond to a resolution-converted image in the appended claims. Further, the second type correlation values SRL1 through SRL3 and the third type correlation values TRL1 through TRL3 in the present embodiment each correspond to a plurality of second correlation values.

FIGS. 16A through 16D are explanatory diagrams for explaining the calculation method of the correlation values according to the third embodiment. FIG. 16A shows template image data. In FIGS. 16A through 16D, it is assumed that the size of the template images is 3×3 pixels, and the pixel value of each of the pixels is $T_{mn}$ (m=1, 2, 3; n=1, 2, 3) in order to simplify the explanation. FIG. 16B shows the taken image data. The pixel value of the attention pixel NP(i, j) in the taken image data is denoted as $P_{i,j}$ (i, j are arbitrary integers). FIG. 16C conceptually shows the resolution conversion (double) of the taken image. In the case of calculating the correlation value between the template image and the double magnified image doubled in resolution, the correlation value with the template image T is calculated (FIG. 16D) using 3×3 pixels centered on the attention pixel NP. In other words, the correlation value $SRL_2(i, j)$ of the attention pixel NP(i, j) can be calculated using formula 3 below.

$$SRL_2(i,j)=P_{i-1,j-1} \times T_{11}+P_{i-1,j} \times (T_{12}+T_{13})+P_{i,j-1} \times T_{21}+ P_{i,j} \times (T_{22}+T_{23})+P_{i,j-1} \times T_{31}+P_{i,j} \times (T_{32}+T_{33}) \qquad (3)$$

Also in the case in which the size of the template image is 13×13 pixels, the correlation value can be calculated using the formula 3 described above on the same grounds. In the case of using the quadruply magnified image quadrupled in resolution, the correlation value can also be calculated using the formula in the same manner.

The correlation value map generation section 640 adds the nine correlation values (FRL1 through FRL3, SRL1 through SRL3, and TRL1 through TRL3), which are calculated by the correlation value calculation section 620, to one another for each of the pixels of the taken image $M_0$ to thereby generate (step S130B shown in FIG. 15) the correlation value map RLT. The pointing element detection section 660 calculates the centroid of the correlation values of the high correlation value area R12 similarly to the above to detect (step S150A) the position of the tip portion 81 of the non-light-emitting pointing element 80.

According to the third embodiment, the correlation values are calculated using the images obtained by increasing the resolution of the taken image, then all of the correlation values obtained using the images with a plurality of resolutions are added to one another to thereby generate the correlation value map RLT. The size of the non-light-emitting pointing element 80 included in the taken image $M_0$ is different by the distance between the non-light-emitting pointing element 80 and the imaging section 300. In the case in which the distance between the non-light-emitting pointing element 80 and the imaging section 300 is short, namely in the case in which the non-light-emitting pointing element 80 is located in an upper part (the positive side in the Y direction in FIGS. 4A and 4B is defined as the upper side) of the projected screen PS, the size of the non-light-emitting pointing element 80 included in the taken image $M_0$ is relatively large. In contrast, in the case in which the distance between the non-light-emitting pointing element 80 and the imaging section 300 is long, namely in the case in which the non-light-emitting pointing element 80 is located in a lower part of the projected screen PS, the size of the non-light-emitting pointing element included in the taken image $M_0$ is relatively small. Therefore, in the case in which the template image T is generated in accordance with the size of the non-light-emitting pointing element 80 included in the taken image when, for example, the non-light-emitting pointing element 80 is located in an upper part of the projected screen PS, the high correlation value cannot be obtained between the taken image taken when the non-light-emitting pointing element 80 is located in a lower part of the projected screen PS and the template image T. In the third embodiment, the correlation value with the template image T is calculated after increasing the resolution of the taken image. In other words, conceptually, the image is magnified, and then the correlation value with the template image is calculated. Therefore, even in the case in which the size of the non-light-emitting pointing element 80 included in the taken image is small, the high correlation value can be obtained using the same template image. As a result, the detection accuracy of the non-light-emitting pointing element 80 can be improved.

D. Fourth Embodiment

Figure 17:
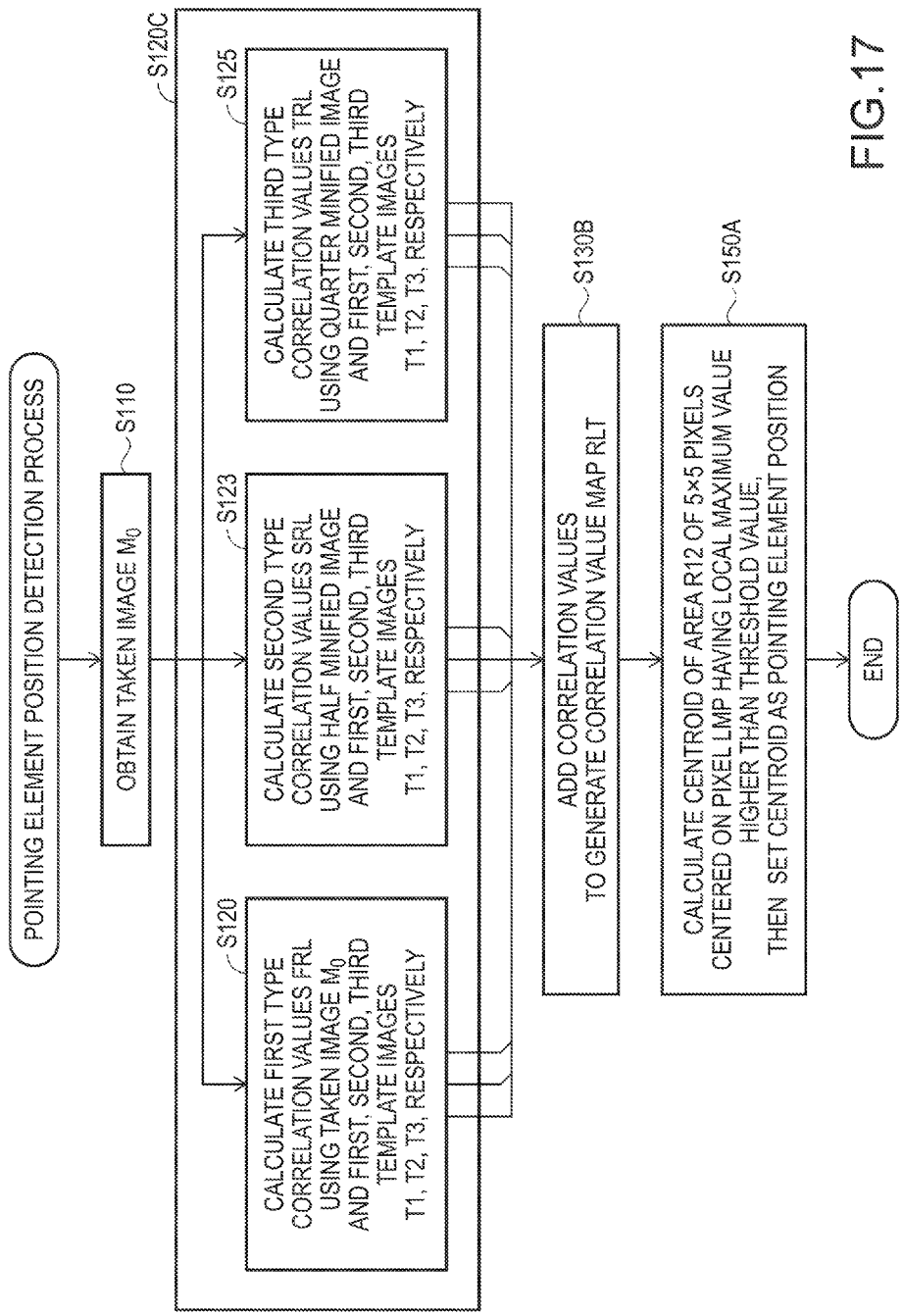
FIG. 17 is a flowchart of a pointing element position detection process according to a fourth embodiment of the invention.

FIG. 17 is a flowchart showing flow of a pointing element position detection process according to a fourth embodiment. In the fourth embodiment, an image decreased in resolution is also used in the process (step S120C in FIG. 17) of calculating the correlation values between the template images T and the taken image $M_0$. The rest of the process is substantially the same as that of the second embodiment described above. In the process (step S120C in FIG. 17) of calculating the correlation values between the template images T and the taken image $M_0$, the correlation value calculation section 620 performs the process (step S120) of calculating a first type correlation value FRL between each of the template images T and the taken image $M_0$ using the taken image $M_0$ and the plurality of template images T1 through T3, a process (step S123) of calculating a second type correlation value SRL between each of the template images T and the taken image $M_0$ using a half minified image with a resolution a half of that of the taken image $M_0$ and the plurality of template images T1 through T3, and a process (step S125) of calculating a third type correlation value TRL between each of the template images T and the taken image $M_0$ using a quarter minified image with a resolution a fourth of that of the taken image $M_0$ and the plurality of template images T1 through T3 in parallel to one another. The step S120 in the fourth embodiment is substantially the same as the step S120 in the third embodiment described above. In each of the steps S123 and S125, the three correlation values are calculated similarly to the step S120 using the images with the resolutions a half and a fourth of the resolution of the taken image $M_0$, respectively. In other words, in the fourth embodiment, in the process (step S120C) of calculating the correlation values between the template images T and the taken image $M_0$, the nine correlation values (FRL1 through FRL3, SRL1 through SRL3, and TRL1 through TRL3) are also calculated. The half minified image and the quarter minified image in the present embodiment each correspond to the resolution-converted image in the appended claims. Further, the second type correlation values SRL1 through SRL3 and the third type correlation values TRL1 through TRL3 in the present embodiment each correspond to the plurality of second correlation values.

FIG. 18 is an explanatory diagram for explaining the calculation method of the correlation values according to the fourth embodiment. FIG. 18 conceptually shows the calculation method of the correlation value using the half minified image. In the case of calculating the correlation value with the template image T using the half minified image, the correlation value with the template image T is calculated using 6×6 pixels centered on the attention pixel NP (indicated with hatching in FIG. 18) as shown in FIG. 18. In other words, the correlation value $SRL_{1/2}(i, j)$ of the attention pixel NP can be calculated using the formula 4 below.

$$SRL_{1/2}(i,j)=\frac{1}{4}\{(P_{i-2,j-2}+P_{i-2,j-1}+P_{i-1,j-2}+P_{i-1,j-1})\times T_{11}+(P_{i-2,j}+P_{i-2,j+1}+P_{i-1,j}+P_{i-1,j+1})\times T_{12}+ \ldots \\ +(P_{i+2,j+2}+P_{i-2,j+3}+P_{i+3,j+2}+P_{i+3,j+3})\times T_{33}\} \qquad (4)$$

Here, as the pixel value of the pixel in the half minified image having a half resolution, the average value of the pixel values of the four pixels not yet minified is used. In the formula 4, "¼" is multiplied in order to average the pixel values of the four pixels not yet minified.

Also in the case in which the size of the template image is 13×13 pixels, the correlation value can be calculated using a calculation formula corresponding to the formula 4 described above on the same grounds. In the case of using the quarter minified image having a fourth resolution, the correlation value can also be calculated using the formula in the same manner.

The correlation value map generation section 640 adds the nine correlation values (FRL1 through FRL3, SRL1 through SRL3, and TRL1 through TRL3), which are calculated by the correlation value calculation section 620, to one another for each of the pixels of the taken image $M_0$ to thereby generate (step S130B shown in FIG. 17) the correlation value map RLT. The pointing element detection section 660 calculates the centroid of the correlation values of the high correlation value area R12 similarly to the above to detect (step S150A) the position of the tip portion 81 of the non-light-emitting pointing element 80.

According to the present embodiment, the correlation values are calculated using the images obtained by decreasing the resolution of the taken image, then all of the correlation values obtained using the images with a plurality of resolutions are added to one another to thereby generate the correlation value map RLT. In other words, conceptually, the image is minified, and then the correlation value with the template image is calculated. Therefore, even in the case in which the size of the non-light-emitting pointing element 80 included in the taken image is large (i.e., in the case in which the non-light-emitting pointing element 80 is located in an upper part of the projected screen PS), the high correlation value can be obtained using the template image T generated in accordance with the size of the non-light-emitting pointing element 80 included in the taken image when the non-light-emitting pointing element 80 is located in a lower part of the projected screen PS. As a result, the detection accuracy of the non-light-emitting pointing element 80 can be improved.

E. Fifth Embodiment

Figure 19:
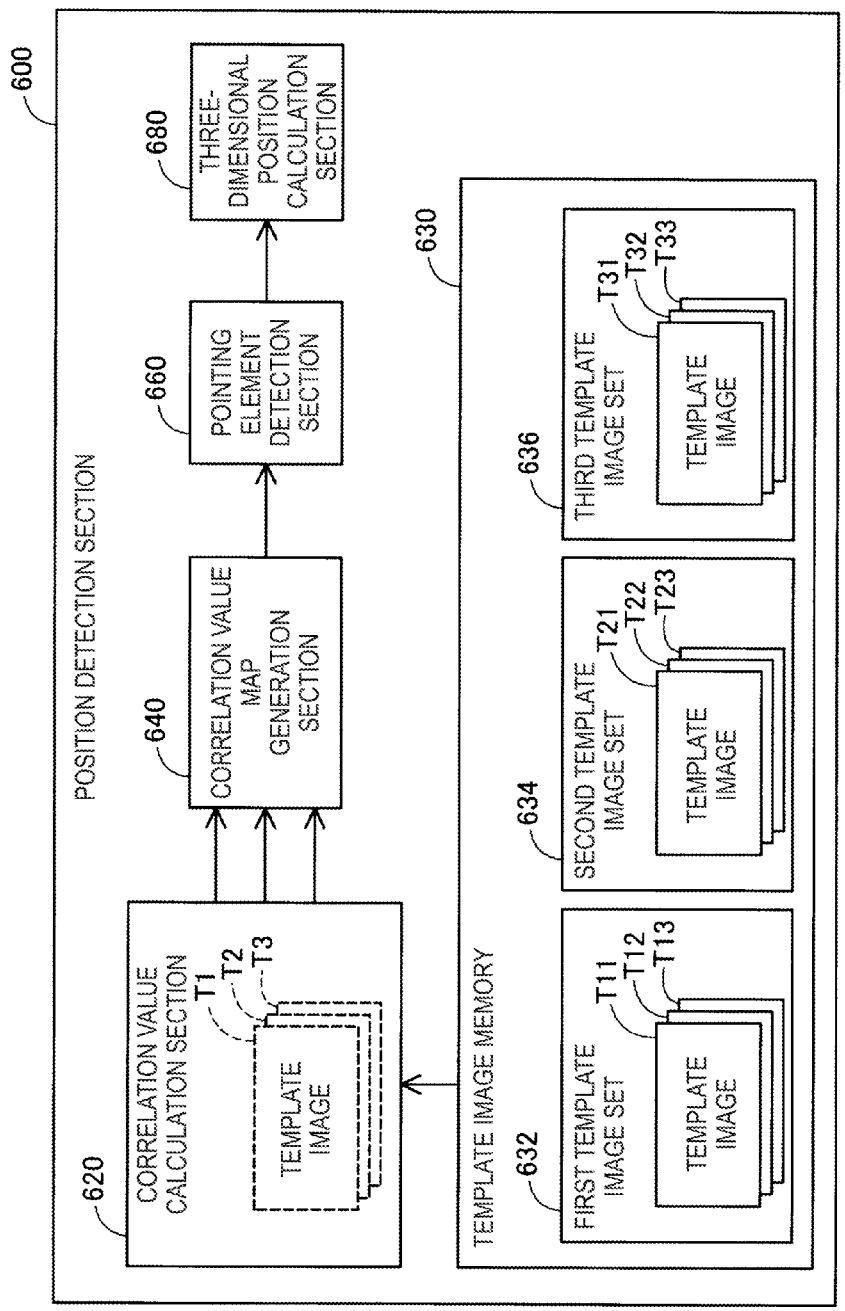
FIG. 19 is a block diagram showing a schematic configuration of a position detection section of an interactive projector according to a fifth embodiment of the invention.

FIG. 19 is a block diagram showing a schematic configuration of a position detection section of an interactive projector according to a fifth embodiment of the invention. The interactive projector according to the fifth embodiment is further provided with a template image memory 630 in the position detection section 600 of the interactive projector 100 according to the first embodiment. The template image memory 630 is provided with a first template image set 632, a second template image set 634, and a third template image set 636. The template image sets are each provided with three template images similar to the template images T in the first embodiment. The template image sets are different in the size of the template images from one another. As shown in FIG. 1, the interactive projector is fixed in front of and above the screen plate 920 with the support member 910. The interactive projector according to the fifth embodiment is configured applicable to three sizes of screen plates 920. In the present embodiment, there are used the screen plates 920 having sizes of 60 inches, 80 inches, and 100 inches, respectively. The first template image set 632 is for the screen plate of 60 inches, the second template image set 634 is for the screen plate of 80 inches, and the third template image set 636 is for the screen plate of 100 inches, and the sizes of the template images fulfill the relationship of (first template image set 632)>(second template image set 634)>(third template image set 636). The sizes of the screen plates 920 and the number of the template image sets are not limited to those in the present embodiment, but can arbitrarily be set.

In the interactive projector according to the present embodiment, the correlation value calculation section 620 reads in the template image set corresponding to the size of the screen plate 920 from the template image memory 630 at the time of startup. The sizes of the screen plates 920 are set to the control section 700 or the like in advance when, for example, delivered. The projector is installed with the projection distance different by the size of the screen plate 920. The larger the size of the screen plate 920 is, the longer the projection distance is. In other words, the larger the size of the screen plate 920 is, the longer the distance between the imaging section 300 and the projected screen PS is. Therefore, the larger the size of the screen plate 920 is, the smaller the size of the pointing element 780 included in the taken image becomes. In the present embodiment, since the template images are generated so that the sizes of the template images fulfill the relationship of (first template image set 632)>(second template image set 634)>(third template image set 636), the template matching can be performed using the template having the size suitable for the size of the non-light-emitting pointing element 80 included in the taken image. Therefore, the detection accuracy of the non-light-emitting pointing element 80 is improved. Further, compared to the case of setting the single template image set corresponding to the size of the screen plate 920 to the correlation value calculation section 620 at the time of manufacturing the interactive projector, since the template image set is set in accordance with the size of the screen plate 920 only by setting the size of the screen plate 920 at the time of delivery, even in the case in which the size of the screen plate 920 is changed, the suitable template image set can easily be used without changing the projector or replacing the memory. Therefore, the convenience of the user is improved. Further, a contribution to the cost reduction is obtained. It should be noted that although in the present embodiment, the configuration in which the template image memory 630 is provided with three template image sets is described as an example, the invention is not limited to this configuration. For example, it is also possible to adopt a configuration in which three template image memories are provided, and each of the template image memories is provided with the first template image set 632, the second template image set 634, and the third template image set 636. According also to this configuration, substantially the same advantages can be obtained.

F. Modified Examples

It should be noted that the invention is not limited to the specific examples and the embodiments described above, but can be put into practice in various forms within the scope or the spirit of the invention, and the following modifications, for example, are also possible.

Modified Example 1

Although in the embodiments described above, the interactive projector capable of using both of the light-emitting pointing element 70 and the non-light-emitting pointing element 80 as the pointing element is described as an example, it is also possible to adopt the configuration in which only the non-light-emitting pointing element 80 is available.

Modified Example 2

Although in the embodiments described above, it is assumed that the imaging section 300 includes the two cameras 310, 320, it is also possible to adopt the configuration of providing one camera to the imaging section 300, or the configuration of providing three or more cameras to the imaging section 300. In the latter case, the three-dimensional coordinate (X, Y, Z) is determined based on m (m is an integer equal to or greater than 3) images taken by the m cameras. For example, it is possible to obtain the three-dimensional coordinates using $_mC_2$ combinations obtained by arbitrarily selecting two images out of the m images, and then obtain the final three-dimensional coordinate using the average value of the three-dimensional coordinates. By adopting this configuration, the detection accuracy of the three-dimensional coordinate can further be improved.

Modified Example 3

Although in the embodiments described above, it is assumed that the interactive projection system 900 can act in the whiteboard mode and the PC interactive mode, the system can also be configured so as to act in either one of the modes. Further, it is also possible for the interactive projection system 900 to be configured so as to act only in other modes than these two modes, or further to be configured so as to be able to act in a plurality of modes including these two modes.

Modified Example 4

Although in the embodiments described above it is assumed that the irradiating detection light IDL, the reflected detection light RDL, the device signal light ASL, and the pointing element signal light PSL shown in FIG. 3 are all the near infrared light, it is also possible to assume that some or all of these types of light are light other than the near infrared light.

Modified Example 5

In the embodiments described above, there is described the example of calculating the correlation value by the pixel of the taken image in the case of calculating the correlation value between each of the template images and the taken image using the image (resolution-converted image) different in resolution from the taken image and the three template images. The correlation value can also be calculated by a pixel of the resolution-converted image. In the case of calculating the correlation value by the pixel of the resolution-converted image, it is sufficient to add the respective correlation values for each of the pixels of the taken image when generating the correlation value map. For example, in the case of calculating the second type correlation value by the pixel of the double magnified image with the resolution two times as high as the resolution of the taken image, since the number of the second type correlation values becomes four times as large as that in the case of calculating the second type correlation value by the pixel of the taken image $M_0$, it is possible to add the average value of the second type correlation values of the four pixels corresponding to one pixel of the taken image in the double magnified image for each of the pixels of the taken image, or to add the second type correlation value of predetermined one of the four pixels corresponding to one pixel of the taken image in the double magnified image. Further, in the case in which the second type correlation value is calculated by the pixel of the half minified image with a resolution a half of the resolution of the taken image, the correlation value of one pixel of the half minified image can also be added to each of the four pixels of the taken image corresponding to the one pixel of the half minified image.

Modified Example 6

Although in the embodiments described above, there is illustrated a configuration in which the interactive projector 100 is provided with the detection light irradiation section 410, it can also be adopted a configuration in which the detection light irradiation section 410 is not provided. In the case in which the interactive projector 100 is not provided with the detection light irradiation section 410, it is possible to provide the support member 910 or the like with a configuration in which the screen surface SS and a space in front of the screen surface SS are irradiated with the irradiating detection light for detecting the tip of the non-light-emitting pointing element 80. It should be noted that in the case of the configuration in which the interactive projector is provided with the detection light irradiation section as in the case of the embodiments described above, the projector can easily control the irradiation timing of the detection light in association with the imaging timing by the cameras, which is preferable. Further, in the case in which the interactive projector 100 is not provided with the detection light irradiation section 410, it is also possible to provide both of the two cameras 310, 320 with a configuration having an imaging function of receiving and then imaging light including visible light, and to provide a configuration of detecting the tip of the non-light-emitting pointing element 80 based on the taken image obtained by receiving and then imaging the light including the visible light. It should be noted that in the case of the configuration in which the interactive projector is provided with the detection light irradiation section as in the case of the embodiments described above, the non-light-emitting pointing element can more easily and accurately be detected compared to the configuration of performing the detection based on the taken image obtained by receiving and then imaging the light including the visible light.

Modified Example 7

Although in the embodiments described above, there is described the example of generating the correlation value map by adding the correlation values, which have been generated for the respective template images, to each other by the pixel of the taken image, it is also possible to adopt a configuration of generating the correlation value map by extracting the maximum value for each of the pixels of the taken image without adding the correlation values.

Modified Example 8

In the second through fourth embodiments described above, the pointing element detection section 660 selects the area of 5×5 pixels centered on the pixel LMP having the local maximum value greater than threshold value Th in the correlation value map RLT as the high correlation value area R12, and determines the centroid position G of the correlation values of the pixels in the high correlation value area R12 as the position (the pointing element position) of the tip portion 81 of the non-light-emitting pointing element (step S150A). In this step, it is also possible to further add a process of comparing the difference between the largest value (190 in FIG. 14A) of the outermost pixels (16 pixels in FIG. 14A) in the high correlation value area R12 and the local maximum value (210 in FIG. 14A) with a predetermined threshold value. For example, it is also possible to arrange that in the case in which the difference between the largest value of the outermost pixels in the high correlation value area R12 and the local maximum value is smaller than the predetermined threshold value, the local maximum value is excluded (regarded not to be the local maximum value). According to this configuration, in the case in which, for example, the pixel values of the correlation value map are generally high, the non-light-emitting pointing element 80 can more appropriately be detected. Further, by contraries, it is also possible to arrange that in the case in which the difference between the largest value of the outermost pixels in the high correlation value area R12 and the local maximum value is higher than the predetermined threshold value, the local maximum value is excluded (regarded not to be the local maximum value). According to this configuration, the noise can be eliminated, and the non-light-emitting pointing element can more stably be detected. It should be noted that it is possible to use the largest value of the innermost pixels (24 pixels in FIG. 14A) surrounding the high correlation value area R12 instead of the largest value of the outermost pixels in the high correlation value area R12.

Although the embodiments of the invention are hereinabove explained based on some specific examples, the embodiments of the invention described above are only for making it easy to understand the invention, but not for limiting the scope of the invention. It is obvious that the invention can be modified or improved without departing from the scope of the invention and the appended claims, and that the invention includes the equivalents thereof.

What is claimed is:
1. An interactive projector that projects a projected screen on a screen surface and that is capable of receiving an instruction of a user to the projected screen with a pointing element, comprising:
an imaging device adapted to take a taken image of an area of the projected screen including the pointing element; and at least one processor that executes one or more programs stored in a non-transitory computer-readable storage medium to realize one or more functions of:
- a correlation value calculation section adapted to calculate a plurality of first correlation values for each of a plurality of pixels of the taken image by comparing each of a plurality of template images different from each other to the taken image pixel by pixel, such that each first correlation value for each pixel corresponds to the comparison between the taken image and one of the plurality of template images;
- a correlation value map generation section adapted to calculate a plurality of correlation value sums, each corresponding to one pixel of the plurality of pixels, by adding together the plurality of first correlation values calculated for the pixel, and generate a correlation value map representing the correlation value sums for each pixel; and
- a pointing element detection section adapted to extract a high correlation value area which includes pixels having correlation value sums equal to or higher than a predetermined threshold value in the correlation value map, and calculate a centroid of the correlation value sums in the high correlation value area with an accuracy corresponding to a value smaller than one pixel to thereby detect a tip position of the pointing element based on the centroid.

2. The interactive projector according to claim 1, wherein the correlation value calculation section further calculates a plurality of second correlation values for each pixel of the taken image by comparing a resolution-converted image, obtained by converting a resolution of the taken image, to each of the plurality of template images, and
the correlation value map generation section generates the correlation value map based on the plurality of first correlation values and the plurality of second correlation values.

3. The interactive projector according to claim 2, wherein the correlation value map generation section adds the plurality of first correlation values and the plurality of second correlation values generated for the respective template images to each other for each of the plurality of pixels of the taken image to generate the correlation value map.

4. The interactive projector according to claim 1, wherein the correlation value calculation section further calculates a plurality of second correlation values for each pixel of a resolution-converted image by comparing the resolution-converted image, obtained by converting a resolution of the taken image, to each of the plurality of template images, and
the correlation value map generation section generates the correlation value map based on the plurality of first correlation values and the plurality of second correlation values.

5. The interactive projector according to claim 1, wherein the pointing element detection section extracts an area of a plurality of pixels centered on a position where the correlation value takes a local maximum value as the high correlation value area.

6. A method of controlling an interactive projector that projects a projected screen on a screen surface and that is capable of receiving an instruction of a user to the projected screen with a pointing element, the method comprising:
projecting the projected screen on the screen surface;
taking a taken image of an area of the projected screen including the pointing element;
calculating a plurality of first correlation values for each of a plurality of pixels by comparing each of a plurality of template images different from each other to the taken image pixel by pixel, such that each first correlation value for each pixel corresponds to the comparison between the taken image and one of the plurality of template images;
calculating a plurality of correlation value sums, each corresponding to one pixel of the plurality of pixels by adding together the plurality of first correlation values calculated for the pixel;
generating a correlation value map representing the correlation value sums for each pixel; and
extracting a high correlation value area which includes pixels having correlation value sums equal to or higher than a predetermined threshold value in the correlation value map, and then calculating a centroid of the correlation value sums in the high correlation value area with an accuracy corresponding to a value smaller than one pixel to thereby detect a tip position of the pointing element based on the centroid.

7. An interactive projector that projects a projected screen on a screen surface and that is capable of receiving an instruction of a user to the projected screen with a pointing element, comprising:
an imaging device adapted to take a taken image of an area of the projected screen including the pointing element; and
at least one processor that executes one or more programs stored in a non-transitory computer-readable storage medium to realize one or more functions of:
- a correlation value calculation section adapted to:
  calculate a plurality of first correlation values for each of a plurality of pixels of the taken image by comparing each of a plurality of template images different from each other to the taken image pixel by pixel, such that each first correlation value for each pixel corresponds to the comparison between the taken image and one of the plurality of template images; and
  calculate a plurality of second correlation values for each pixel of the taken image by comparing a resolution-converted image, obtained by converting a resolution of the taken image, to each of the plurality of template images;
- a correlation value map generation section adapted to generate a correlation value map based on the plurality of first correlation values and the plurality of second correction values; and
- a pointing element detection section adapted to extract a high correlation value area which includes pixels having first correlation values and second correlation values equal to or higher than a predetermined threshold value in the correlation value map, and calculate a centroid of the first correlation values and the second correlation values in the high correlation value area with an accuracy corresponding to a value smaller than one pixel to thereby detect a tip position of the pointing element based on the centroid.

8. An interactive projector that projects a projected screen on a screen surface and that is capable of receiving an instruction of a user to the projected screen with a pointing element, comprising:
an imaging device adapted to take a taken image of an area of the projected screen including the pointing element; and at least one processor that executes one or more programs stored in a non-transitory computer-readable storage medium to realize one or more functions of:
a correlation value calculation section adapted to:
calculate a plurality of first correlation values for each of a plurality of pixels of the taken image by comparing each of a plurality of template images different from each other to the taken image pixel by pixel, such that each first correlation value for each pixel corresponds to the comparison between the taken image and one of the plurality of template images; and
calculate a plurality of second correlation values for each pixel of a resolution-converted image by comparing the resolution-converted image, obtained by converting a resolution of the taken image, to each of the plurality of template images;
a correlation value map generation section adapted to generate a correlation value map based on the plurality of first correlation values and the plurality of second correction values; and
a pointing element detection section adapted to extract a high correlation value area which includes pixels having first correlation values and second correlation values equal to or higher than a predetermined threshold value in the correlation value map, and calculate a centroid of the first correlation values and the second correlation values in the high correlation value area with an accuracy corresponding to a value smaller than one pixel to thereby detect a tip position of the pointing element based on the centroid.

* * * * *